US010773331B2

(12) United States Patent
Mehn et al.

(10) Patent No.: US 10,773,331 B2
(45) Date of Patent: Sep. 15, 2020

(54) WELDING POWER SUPPLIES, WIRE FEEDERS, AND SYSTEMS TO COMPENSATE A WELD VOLTAGE VIA COMMUNICATIONS OVER A WELD CIRCUIT

(71) Applicant: Illinois Tool Works Inc., Glenview, IL (US)

(72) Inventors: Peter Mehn, Oshkosh, WI (US); Christopher Hsu, Appleton, WI (US); Maxwell Brock, Appleton, WI (US); Quinn William Schartner, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 866 days.

(21) Appl. No.: 15/238,585

(22) Filed: Aug. 16, 2016

(65) Prior Publication Data
US 2018/0050410 A1  Feb. 22, 2018

(51) Int. Cl.
*B23K 9/095* (2006.01)
*B23K 9/10* (2006.01)

(52) U.S. Cl.
CPC .......... *B23K 9/0956* (2013.01); *B23K 9/0953* (2013.01); *B23K 9/1087* (2013.01)

(58) Field of Classification Search
CPC ... B23K 9/0953; B23K 9/0956; B23K 9/1087
(Continued)

(56) References Cited

U.S. PATENT DOCUMENTS 6,066,832 A  5/2000 Uecker
6,248,976 B1  6/2001 Blankenship
(Continued)

FOREIGN PATENT DOCUMENTS

EP  0575082  12/1993
EP  2444191 A2  4/2012
(Continued)

OTHER PUBLICATIONS

Int'l Search Report and Written Opinion PCT/US2017/043877 dated Nov. 13, 2017 (13 pages).
(Continued)

*Primary Examiner* — Ibrahime A Abraham
*Assistant Examiner* — Biniam B Asmelash
(74) *Attorney, Agent, or Firm* — McAndrews, Held & Malloy, Ltd.

(57) ABSTRACT

Methods and apparatus to communicate via a weld cable are disclosed. An example welding-type power supply includes a power converter, a receiver circuit, and a controller. The power converter converts input power to welding-type power based on a weld voltage setpoint and to output the welding-type power via a weld circuit. The receiver circuit receives a communication via the weld circuit while current is flowing through the weld circuit or after the current has stopped flowing through the weld circuit. The communication includes weld voltage feedback information measured at a device remote from the power supply while the current is flowing through the weld circuit. The controller controls the welding-type power output by the power converter according to a voltage feedback loop using the weld voltage feedback information to regulate a weld voltage at the remote device to the weld voltage setpoint.

18 Claims, 9 Drawing Sheets

(58) Field of Classification Search
USPC .................. 219/130.31, 130.33, 132
See application file for complete search history.

(56) References Cited

U.S. PATENT DOCUMENTS

| | | | |
|---|---|---|---|
| 6,570,130 B1 | 5/2003 | Kooken | |
| 6,624,388 B1 | 9/2003 | Blankenship et al. | |
| 6,906,285 B2 | 6/2005 | Zucker | |
| 7,180,029 B2 | 2/2007 | Ott | |
| 8,330,077 B2 | 12/2012 | Rappl | |
| 8,592,724 B2 | 11/2013 | Ott | |
| 8,779,329 B2 | 7/2014 | Rappl | |
| 8,957,344 B2 | 2/2015 | Rappl | |
| 9,012,807 B2 | 4/2015 | Ott | |
| 9,162,311 B2 | 10/2015 | Ott | |
| 9,511,444 B2 | 12/2016 | Marschke | |
| 9,662,735 B2 | 5/2017 | Salsich | |
| 9,808,882 B2 | 11/2017 | Hutchison | |
| 2002/0113045 A1 | 8/2002 | Blankenship | |
| 2006/0102698 A1 | 5/2006 | Ihde | |
| 2007/0221642 A1 | 9/2007 | Era | |
| 2008/0296276 A1 | 12/2008 | Schartner | |
| 2010/0133250 A1 | 6/2010 | Sardy | |
| 2010/0301029 A1 | 12/2010 | Meckler | |
| 2010/0308026 A1* | 12/2010 | Vogel .................... H02M 3/157 | |
| | | | 219/130.21 |
| 2010/0314371 A1 | 12/2010 | Davidson | |
| 2013/0264319 A1 | 10/2013 | Temby | |
| 2013/0327747 A1 | 12/2013 | Dantinne | |
| 2013/0327754 A1 | 12/2013 | Salsich | |
| 2014/0001169 A1 | 1/2014 | Enyedy | |
| 2014/0076872 A1 | 3/2014 | Ott | |
| 2014/0131320 A1 | 5/2014 | Hearn | |
| 2014/0217077 A1* | 8/2014 | Davidson ............... B23K 9/173 |
| | | | 219/130.33 |
| 2014/0263256 A1 | 9/2014 | Rappl | |
| 2015/0136746 A1 | 5/2015 | Rappl | |
| 2015/0158104 A1 | 6/2015 | Rappl | |
| 2015/0196970 A1 | 7/2015 | Denis | |
| 2015/0224591 A1 | 8/2015 | Ott | |
| 2015/0273611 A1 | 10/2015 | Denis | |
| 2016/0158868 A1* | 6/2016 | Trinnes ................ B23K 9/1087 |
| | | | 219/137 PS |
| 2017/0021442 A1 | 1/2017 | Denis | |

FOREIGN PATENT DOCUMENTS

| | | |
|---|---|---|
| EP | 2444191 A3 | 4/2012 |
| EP | 2960001 | 12/2015 |
| KR | 20120048876 | 5/2012 |
| WO | 2016099642 | 6/2016 |

OTHER PUBLICATIONS

Int'l Search Report and Written Opinion PCT/US/2018/019709 dated Jun. 14, 2018 (16 pages).
Int'l Search Report and Written Opinion PCT/US2018/019678 dated Jun. 26, 2018 (14 pages).
Database WPI 1-21 Week 201237 Thomson Sci ent ifi c, London, GB; AN 2012-G07705 XP002781589 (3 pgs.).
Canadian Patent Office Action Appln No. 3,032,634 dated Oct. 8, 2019 (3 pgs).

* cited by examiner

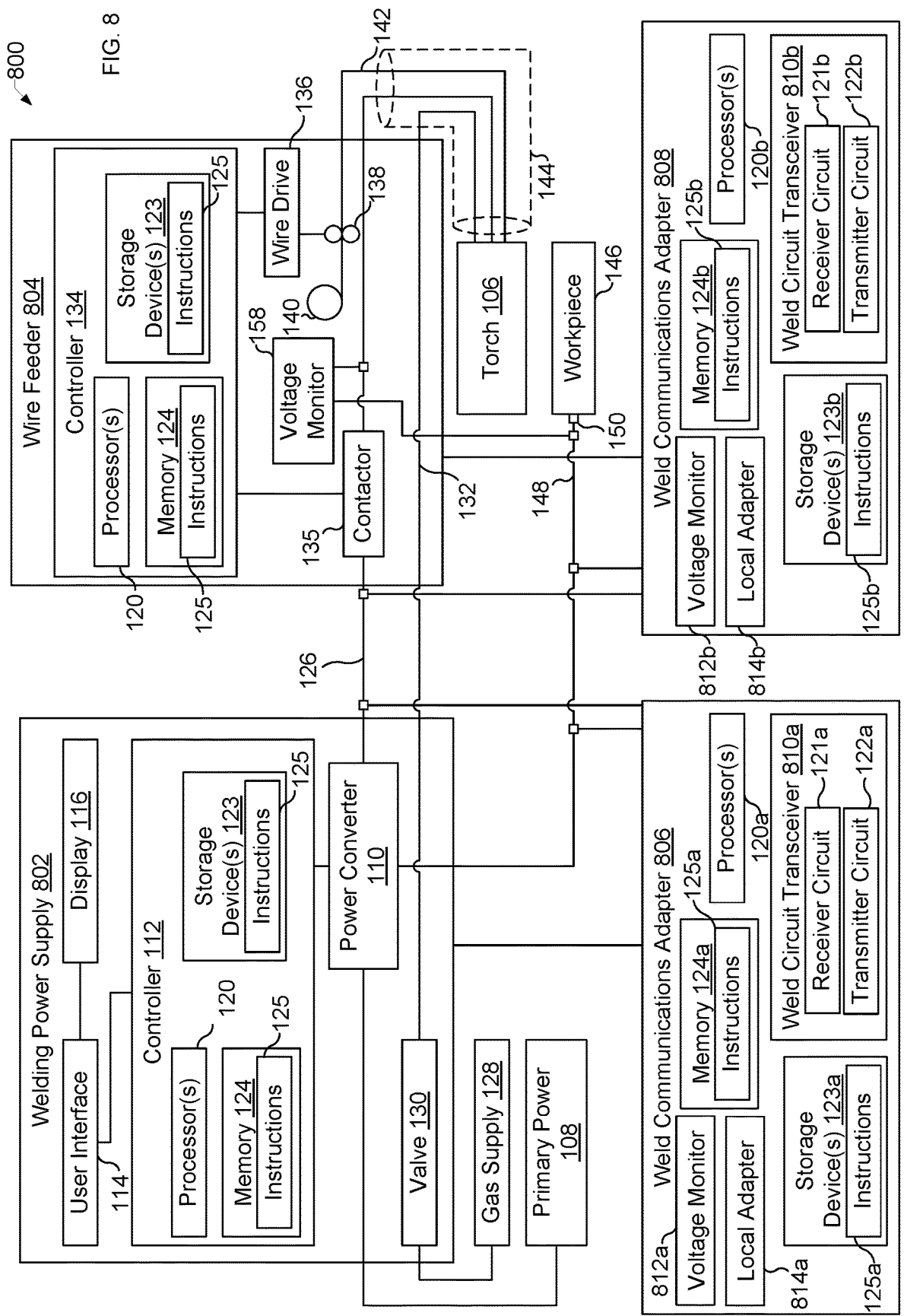

WELDING POWER SUPPLIES, WIRE FEEDERS, AND SYSTEMS TO COMPENSATE A WELD VOLTAGE VIA COMMUNICATIONS OVER A WELD CIRCUIT

BACKGROUND

The invention relates generally to welding systems, and more particularly to welding power supplies, wire feeders, and systems to compensate a weld voltage via communications over a weld circuit.

Some welding applications, such as coal-fired boiler repair, shipyard work, and so forth, may position a welding location or workpiece large distances from a multi-process welding power source. The power source provides conditioned power for the welding application, and the welder must pull and monitor a long welding power cable extending from the power source to the welding location. Accordingly, the location of power terminals (e.g., plugs) and controls on or proximate to the welding power source may require the user to stop welding and return to the power source to plug in auxiliary devices, make changes to the welding process, and so forth. In many applications, this may entail walking back considerable distances, through sometimes complex and intricate work environments. Additionally, weld cables (and, particularly, long weld cables) introduce a non-negligible voltage drop between the power source and the site of the work (e.g., the wire feeder, the torch).

Accordingly, there exists a need for systems and methods for providing accurate weld voltages that correspond to the weld voltages set on the weld equipment, and particularly without requiring additional communications cables or using wireless communications equipment that can be unreliable in a weld environment.

SUMMARY

Welding power supplies, wire feeders, and systems to compensate a weld voltage via communications over a weld circuit are disclosed, substantially as illustrated by and described in connection with at least one of the figures, as set forth more completely in the claims.

BRIEF DESCRIPTION OF THE DRAWINGS

FIG. 8 illustrates another example welding system including weld communications adapters in accordance with aspects of this disclosure.

DETAILED DESCRIPTION

Figure 1:
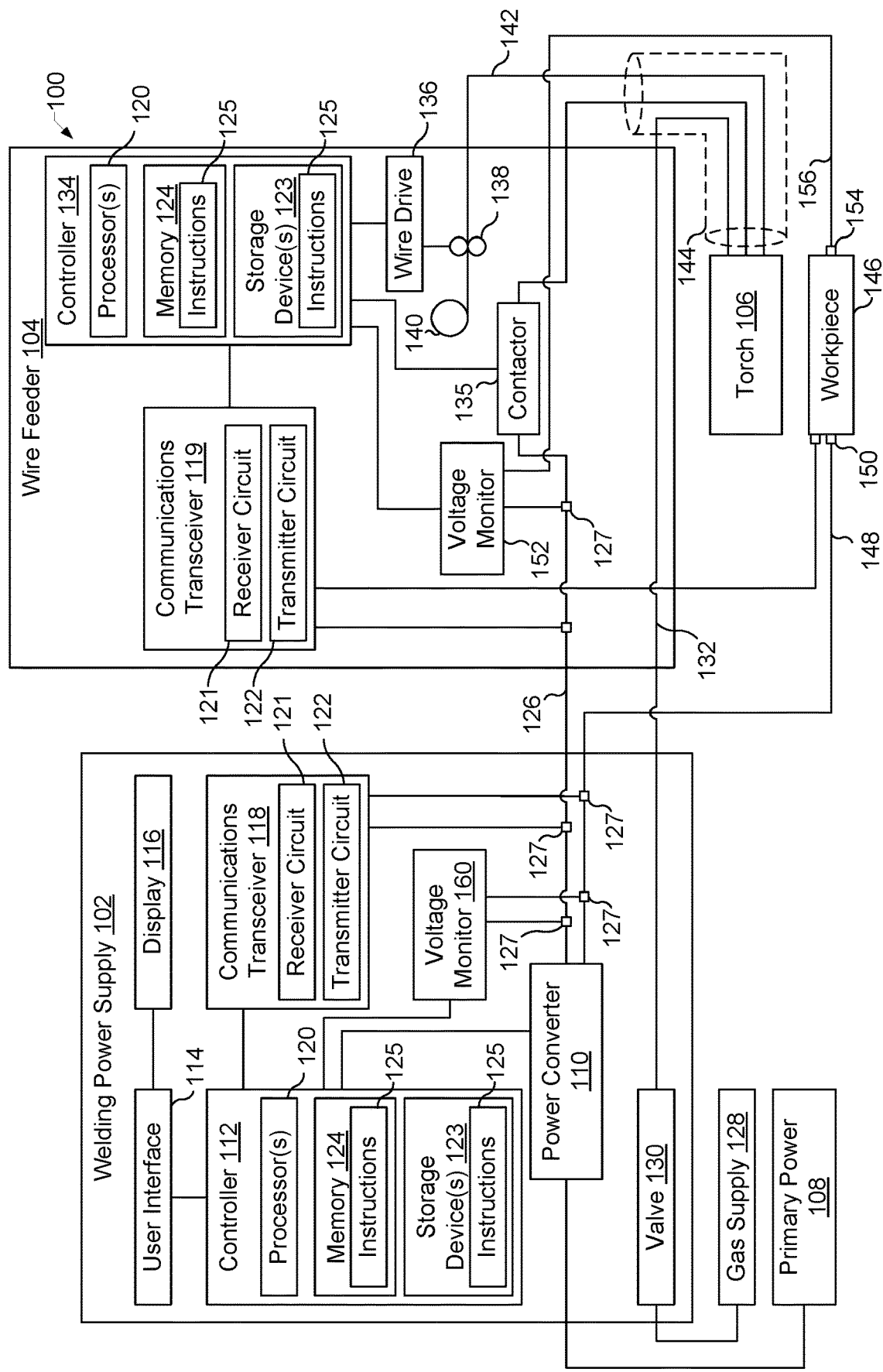
FIG. 1 shows an example welding-type system in accordance with aspects of this disclosure.

Weld cable communications enable components of welding systems, such as a welding power supply and a wire feeder, to communicate via a same cable used to deliver welding current from the power supply to the wire feeder (and to a welding torch attached to the wire feeder). Weld cable communications enable a simplification of a welding system by, for example, removing one or more cables that were conventionally used for control signals.

Disclosed examples provide for a voltage sensing wire feeder for welding that enables a welding power supply to adjust an arc voltage (e.g., a voltage across an arc, between the electrode and the workpiece) to compensate for the voltage drop over the weld cable between the welding power supply and a remote wire feeder. As used herein, the term "remote" refers to not being in a same physical enclosure. For example, a wire feeder that is separate from a welding power supply (e.g., connected to the welding power supply by a weld cable) is considered a remote wire feeder for the purposes of this disclosure.

In some examples, a remote wire feeder measures the arc voltage and communicates the arc voltage to the power supply via the weld circuit as weld voltage feedback information while the weld circuit is conducting weld current (e.g., during a weld operation), which enables the power supply to adjust the voltage and/or current output by the power supply. For example, the power supply may adjust the voltage and/or current to reduce or minimize a difference between the actual (e.g., measured) arc voltage and a weld voltage setpoint. In some other examples, the remote wire feeder stores the voltage measurements in an internal memory and transmits the voltage measurements to the power supply when the welding operation has completed.

Disclosed example power supplies execute a weld voltage control loop, and use the voltage measurements from the remote wire feeder as a feedback mechanism in the control loop to adjust the output power. In some examples, the power supply calculates a profile of the weld cable and/or the weld circuit, which is used during subsequent welds to compensate the output power to result in the arc voltage being substantially equal to the weld voltage setpoint. Thus, disclosed examples provide more predictable and reliable weld voltages to a welder.

Some conventional power supplies and welders communicate using control cables that are separate from the weld circuit. However, such control cables are fragile, expensive, and cause additional hazards in a welding environment, particularly when there are relatively long distances (e.g., 100 feet or more) between the power supply and the remote wire feeder. Disclosed examples enable voltage compensation by the power supply without the requirement of additional control cables or wireless communications that are unreliable in electrically noisy welding environments.

As used herein, the term "port" refers to one or more terminals(s), connector(s), plug(s), and/or any other physical interface(s) for traversal of one or more inputs and/or outputs. Example ports include weld cable connections at which a weld cable is physically attached to a device, a gas hose connector connectors that may make physical and/or electrical connections for input and/or output of electrical signals and/or power, physical force and/or work, fluid, and/or gas.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "weld voltage setpoint" refers to a voltage input to the power converter via a user interface, network communication, weld procedure specification, or other selection method.

As used herein, a "circuit" includes any analog and/or digital components, power and/or control elements, such as a microprocessor, digital signal processor (DSP), software, and the like, discrete and/or integrated components, or portions and/or combinations thereof.

As used herein, the term "weld circuit" includes any and all components in an electrical path of a welding operation, regardless whether the welding operation is underway. For example, the weld circuit is considered to include any or all of: power conversion and/or conditioning component(s), weld cable conductor(s), weld torch(es), consumable or non-consumable welding electrode(s), workpiece(s), work clamp(s), ground cable(s) (return cables), weld cable connections (e.g., weld studs that connect a welding power supply to a weld cable). As used herein, the "weld circuit" does not include components or conductors that do not conduct weld current at any time (i.e., that are not in the electrical path of the weld current). For example, the weld circuit does not include separate control cables that transmit data but do not transmit weld current.

As used herein, the term "filtering," as it applies to voltage and/or current values, refers to generating one or more representative values from a larger set of values. For example, a set of voltage values or measurements may be filtered to obtain an average voltage, a root-mean-square value of the voltage values, or any other representative or derivative value(s).

Disclosed example welding-type power supplies include a power converter, a receiver circuit, and a controller. The power converter converts input power to welding-type power based on a weld voltage setpoint and to output the welding-type power via a weld circuit. The receiver circuit receives a communication via the weld circuit while current is flowing through the weld circuit or after the current has stopped flowing through the weld circuit. The communication includes weld voltage feedback information measured at a device remote from the power supply while the current is flowing through the weld circuit. The controller controls the welding-type power output by the power converter according to a voltage feedback loop using the weld voltage feedback information to regulate a weld voltage at the remote device to the weld voltage setpoint.

In some examples, the controller is configured to control a voltage of the welding-type power output by the power converter according to the voltage feedback loop by adjusting the welding-type power while the current is being output through the weld circuit. In some examples, the controller is configured to control the voltage of the welding-type power output by the power converter according to the voltage feedback loop by adjusting a voltage compensation value applied to the welding-type power based on the weld voltage setpoint and a measured voltage included in the weld voltage feedback information. The controller stores the voltage compensation value for generating the welding-type power for a subsequent weld. In some such examples, the controller is configured to adjust the voltage of the welding-type power output by the power converter based on the voltage compensation value during the subsequent weld. In some examples, the controller is configured to control the voltage of the welding-type power output by the power converter based on a plurality of communications received via the weld circuit. The plurality of communications corresponding to a plurality of voltage measurements. In some such examples, the controller is configured to store the plurality of voltage measurements that are taken at the remote device and at the power supply and that correspond to at least one of power supply output voltage measurements or welding current measurements. The controller determines the voltage compensation value based on the at least one of the power supply output voltage measurements or the welding current measurements.

Some example welding-type power supplies further include a power source voltage monitor to measure an actual power source output voltage. The controller executes the voltage feedback loop using the weld voltage feedback information, the weld voltage setpoint, and the actual power source output voltage. In some such examples, the weld voltage feedback information comprises a filtered arc voltage of the welding-type power measured at a wire feeder. The power source voltage monitor determines a filtered power supply output voltage of the welding-type power measured at an output terminal of the welding-type power supply, and the controller adjusts the weld voltage of the welding-type power based on a difference between the filtered arc voltage and the filtered power supply output voltage. In some examples, the controller controls the voltage of the welding-type power by determining an adjusted weld voltage setpoint based on the weld voltage setpoint and the difference between the filtered arc voltage and the filtered power supply output voltage. In some such examples, the controller adjusts the welding-type power based on a difference between the adjusted weld voltage setpoint and the filtered power supply output voltage.

In some example welding-type power supplies, the controller adjusts the welding-type power at a first rate and the receiver circuit is configured to receive the weld voltage feedback information at a second rate that may be different than the first rate (e.g., slower than the first rate). The controller adjusts the welding-type power at the first rate based on a most recently received weld voltage feedback information. In some examples, the weld voltage feedback information comprises a voltage error between the voltage setpoint and a voltage measured at the device remote from the power supply while the current is flowing through the weld circuit, and the controller controls the welding-type power output using the voltage error. In some such examples, the controller calculates an impedance of a weld cable in the weld circuit using the voltage error.

In some examples, the weld voltage feedback information includes a characteristic of a weld cable that is part of the weld circuit, and the controller controls the welding-type power output using the characteristic. In some such examples, the characteristic comprises a calculated impedance of the weld cable. In some example welding-type power supplies, the weld voltage feedback information includes a voltage setpoint command, and the controller controls the welding type power output using the voltage setpoint command by controlling the power converter to output the welding-type power having a voltage determined by the voltage setpoint command. Additionally or alternatively, the weld voltage feedback information may include information that can be used to calculate the weld cable characteristic (e.g., measured weld voltage feedback from a wire feeder). In an example, a power supply receives a set of arc voltage feedback samples and calculates a weld cable impedance using the arc voltage feedback samples in conjunction with corresponding voltage setpoints and current measurements determined at the power supply.

Disclosed example welding-type power supplies include a power converter, a voltage monitor, a receiver circuit, and a controller. The power converter converts input power to welding-type power based on a user-selected voltage and outputs the welding-type power via a weld circuit. The voltage monitor measures a power supply output voltage of the welding-type power during a weld. The receiver circuit receives, via the weld circuit while current is flowing through the weld circuit or after the current has stopped flowing through the weld circuit, a communication including a measured arc voltage of the welding-type power measured at a first location in the weld circuit different than a second location at which the voltage monitor is to measure the power supply output voltage. When the communication including the measured arc voltage is received during the weld, the controller adjusts the welding-type power during the weld to reduce a difference between the user-selected voltage and the measured arc voltage based on the power supply output voltage. When the communication including the measured arc voltage is received after the weld, the controller adjusts a voltage compensation value applied to the welding-type power based on the user-selected voltage, the power supply output voltage, and the measured arc voltage, and stores the voltage compensation value for generating the welding-type power for a subsequent weld.

In some examples, the controller stores the voltage compensation value based on the measured arc voltage measured during a first weld, and adjusts the welding-type power based on the voltage compensation value during the subsequent weld. In some such examples, the controller determines the voltage compensation value based on a plurality of communications received via the weld circuit, where the plurality of communications corresponds to a plurality of arc voltage measurements. In some examples, the controller stores power supply output voltage measurements and/or weld current measurements corresponding to the plurality of arc voltage measurements, and determines the voltage compensation value based on the power supply output voltage measurements and/or the weld current measurements and the arc voltage measurements. In some examples, the voltage compensation value may be determined by calculating a weld cable impedance and/or by performing a lookup of arc voltage measurements, power supply output voltage measurements and/or weld current measurements in a table.

In some example welding-type power supplies, the power supply output voltage is a filtered power supply output voltage of the welding-type power measured at a weld circuit output terminal of the power converter, and the measured arc voltage is a filtered arc voltage of the welding-type power measured at a wire feeder. The controller increases a voltage of the welding-type power based on a difference between the filtered power supply output voltage and the filtered arc voltage. In some such examples, the controller adjusts the welding-type power at a first rate and the receiver circuit receives measurements of the measured arc voltage at a second rate. The controller calculates the difference at the second rate and adjust the welding-type power at the first rate based on a most recent calculation of the filtered arc voltage. In some examples, the second rate is different than the first rate.

In some examples, the controller adjusts the voltage of the welding-type power by determining an adjusted weld voltage setpoint based on the user-selected voltage and the difference between the filtered power supply output voltage and the filtered arc voltage. In some such examples, the controller adjusts the voltage of the welding-type power based on a difference between the adjusted weld voltage setpoint and the filtered power supply output voltage.

Disclosed example welding-type power supplies include a power converter to convert input power to welding-type power based on a weld voltage setpoint and to output the welding-type power via a weld circuit, a receiver circuit to receive voltage feedback information without the use of a separate data transmission cable connection or a voltage sense lead connection, and a controller to control a voltage of the welding-type power output by the power converter according to a voltage feedback loop using the weld voltage feedback information and the weld voltage setpoint.

In some examples, the receiver circuit receives the voltage feedback information further without the use of wireless communications. In some examples, the receiver circuit receives the voltage feedback information via the weld circuit.

Disclosed example welding devices include a voltage monitor and a weld cable communication transmitter. The voltage monitor measures a weld voltage of welding-type power received via a weld circuit during a welding-type operation. The weld cable communication transmitter transmits, via the weld circuit during output of the welding-type power, a communication based on the weld voltage of the welding-type power, or stores the weld voltage in a memory and transmits the communication via the weld circuit after output of the welding-type power has stopped.

Some example welding devices further include a user interface to receive a user selection of a voltage setpoint, where the weld cable communication transmitter transmits a second communication indicative of the user selection of the voltage setpoint. Some such examples further include a controller to determine a voltage setpoint command based on the voltage setpoint and the weld voltage, where the weld cable communication transmitter transmits the voltage setpoint command via the weld circuit. Some examples include a controller to determine an impedance of a weld cable in the weld circuit and to determine the impedance based on the voltage setpoint, the weld voltage, and a current of the welding-type power. Some examples include a controller to determine a voltage error as a difference between the voltage setpoint and the weld voltage, where the weld cable communication transmitter transmits the voltage error via the weld circuit.

Some example welding devices further include a voltage filter circuit to provide a filtered value of the weld voltage over a time period, where the weld cable communication transmitter identifies the filtered value in the communication. Some example welding devices further include a weld cable communications receiver to receive a voltage setpoint, and a controller to determine an impedance of a weld cable connected to the weld circuit, where the controller determines the impedance based on the voltage setpoint, the weld voltage, and a current of the welding-type power. Some example welding devices further include a weld cable communications receiver to receive a voltage setpoint, and a controller to determine a voltage error as a difference between the voltage setpoint and the weld voltage, where the weld cable communication transmitter transmits the voltage error via the weld circuit. In some examples, the welding device is a wire feeder or a pendant control device.

Disclosed example welding-type power supplies include a power converter to convert input power to welding-type power based on a weld voltage setpoint and to output the welding-type power via a weld circuit, and a receiver circuit to receive a communication via the weld circuit while current is flowing through the weld circuit or after the current has stopped flowing through the weld circuit. The communication includes weld voltage feedback information measured at a device remote from the power supply while the current is flowing through the weld circuit. The example welding-type power supplies further include a display device to display the weld voltage feedback information while the current is flowing through the weld circuit.

Disclosed example welding devices include a voltage monitor to measure a voltage of welding-type power received via a weld circuit during a welding-type operation, a display device to display the weld voltage, and a weld cable communication transmitter to transmit, via the weld circuit during output of the welding-type power, a communication representative of the weld voltage of the welding-type power.

Disclosed example weld circuit communications devices include a receiver circuit, a processor, or a local communications adapter. The receiver circuit receives a communication via a weld circuit while current is flowing through the weld circuit or after the current has stopped flowing through the weld circuit. The communication includes weld voltage feedback information measured at a device remote from a power supply and remote from the weld circuit communications device while the current is flowing through the weld circuit. The processor generates power supply control information based on the weld voltage feedback information. The local communications adapter to transmit the power supply control information to control welding-type power output by a power converter to regulate a weld voltage to a weld voltage setpoint.

In some example weld circuit communications devices the power supply control information includes at least one of a voltage setpoint, a voltage error, a weld cable impedance. Some example weld circuit communications devices further include a voltage monitor to measure a power supply output voltage. The weld voltage feedback information includes a remote voltage measured closer to the weld than the power supply output voltage measurement location.

Some example weld circuit communications devices further include a voltage monitor to measure a power source output voltage. The processor generates the power supply control information using the weld voltage feedback information, the weld voltage setpoint, and the measured power source output voltage. In some such examples, the weld voltage feedback information comprises a filtered arc voltage of the welding-type power measured at a wire feeder or a remote communications device, and the voltage monitor determines a filtered power supply output voltage of the welding-type power measured at an output of the power supply. The processor adjusts a weld voltage of the welding-type power based on a difference between the filtered arc voltage and the filtered power supply output voltage.

Some example weld circuit communications devices further include a transmitter to transmit weld information to the remote device via the weld circuit while the current is flowing through the weld circuit. In some examples, the weld voltage feedback information includes a voltage error between the voltage setpoint and a voltage measured at the device remote from the power supply and remote from the weld circuit communications device while the current is flowing through the weld circuit. The processor generates the power supply control information using the voltage error. In some such examples, the processor is configured to calculate an impedance of a weld cable in the weld circuit using the voltage error, where the power supply control information includes the impedance of the weld cable. In some examples, the weld voltage feedback information includes a voltage setpoint command, and the processor provides the voltage setpoint command for control of the power supply to output the welding-type power having a voltage determined by the voltage setpoint command.

Disclosed weld circuit communications device includes a voltage monitor to measure a voltage of welding-type power transmitted via a weld circuit during a welding-type operation, and a transmitter circuit to transmit, via the weld circuit during transmission of the welding-type power over the weld circuit, weld voltage feedback information based on the weld voltage of the welding-type power.

Some example weld circuit communications devices further include a local communications adapter to receive a voltage setpoint from a welding device. Some example weld circuit communications devices further include a processor to determine a voltage setpoint command based on a voltage setpoint and the weld voltage, the transmitter circuit configured to transmit the voltage setpoint command via the weld circuit. In some examples, the transmitter circuit is configured to transmit the voltage setpoint via the weld circuit during transmission of the welding-type power over the weld circuit.

Some example weld circuit communications devices further include a processor to determine an impedance of a weld cable in the weld circuit based on the voltage setpoint, the weld voltage, and a current of the welding-type power, the transmitter circuit configured to transmit the impedance via the weld circuit. Some example weld circuit communications devices further include a processor to determine a voltage error as a difference between the voltage setpoint and the weld voltage, the transmitter circuit to transmit the voltage error via the weld circuit.

Disclosed example weld circuit communications devices include a local communications adapter to receive weld voltage feedback information from a welding device on a first interface, and a transmitter circuit to transmit, via a weld circuit during transmission of welding-type power over the weld circuit, the weld voltage feedback information based on the weld voltage of the welding-type power.

In some examples, the local communications adapters receives a voltage measurement, and the example weld circuit communications device further includes a processor to generate the weld voltage feedback information from the voltage measurement. In some examples, the local communications adapter receives a voltage setpoint from the welding device and the transmitter circuit transmits the voltage setpoint via the weld circuit during transmission of the welding-type power over the weld circuit.

In some examples, the local communications adapter receives a voltage setpoint from the welding device, the weld circuit communications device further includes a processor to determine a voltage error as a difference between the voltage setpoint and the weld voltage, and the transmitter circuit transmits the voltage error via the weld circuit. In some examples, the weld circuit communications device further includes a processor to determine an impedance of a weld cable in the weld circuit based on the voltage setpoint, the weld voltage, and a current of the welding-type power, where the transmitter circuit transmits the impedance via the weld circuit.

Turning now to the drawings, FIG. 1 is a block diagram of an example welding system 100 having a welding power supply 102, a wire feeder 104, and a welding torch 106. The welding system 100 powers, controls, and supplies consumables to a welding application. In some examples, the welding power supply 102 directly supplies input power to the welding torch 106. The welding torch 106 may be a torch configured for shielded metal arc welding (SMAW, or stick welding), tungsten inert gas (TIG) welding, gas metal arc welding (GMAW), flux cored arc welding (FCAW), based on the desired welding application. In the illustrated example, the welding power supply 102 is configured to supply power to the wire feeder 104, and the wire feeder 104 may be configured to route the input power to the welding torch 106. In addition to supplying an input power, the wire feeder 104 may supply a filler metal to a welding torch 106 for various welding applications (e.g., GMAW welding, flux core arc welding (FCAW)). While the example system 100 of FIG. 1 includes a wire feeder 104 (e.g., for GMAW or FCAW welding), the wire feeder 104 may be replaced by any other type of remote accessory device, such as a stick welding and/or TIG welding remote control interface that provides stick and/or TIG welding The welding power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The welding power supply 102 includes a power converter 110, which may include transformers, rectifiers, switches, and so forth, capable of converting the AC input power to AC and/or DC output power as dictated by the demands of the system 100 (e.g., particular welding processes and regimes). The power converter 110 converts input power (e.g., the primary power 108) to welding-type power based on a weld voltage setpoint and outputs the welding-type power via a weld circuit.

In some examples, the power converter 110 is configured to convert the primary power 108 to both welding-type power and auxiliary power outputs. However, in other examples, the power converter 110 is adapted to convert primary power only to a weld power output, and a separate auxiliary converter is provided to convert primary power to auxiliary power. In some other examples, the welding power supply 102 receives a converted auxiliary power output directly from a wall outlet. Any suitable power conversion system or mechanism may be employed by the welding power supply 102 to generate and supply both weld and auxiliary power.

The welding power supply 102 includes a controller 112 to control the operation of the welding power supply 102. The welding power supply 102 also includes a user interface 114. The controller 112 receives input from the user interface 114, through which a user may choose a process and/or input desired parameters (e.g., voltages, currents, particular pulsed or non-pulsed welding regimes, and so forth). The user interface 114 may receive inputs using any input device, such as via a keypad, keyboard, buttons, touch screen, voice activation system, wireless device, etc. Furthermore, the controller 112 controls operating parameters based on input by the user as well as based on other current operating parameters. Specifically, the user interface 114 may include a display 116 for presenting, showing, or indicating, information to an operator. The controller 112 may also include interface circuitry for communicating data to other devices in the system 100, such as the wire feeder 104. For example, in some situations, the welding power supply 102 wirelessly communicates with other welding devices within the welding system 100. Further, in some situations, the welding power supply 102 communicates with other welding devices using a wired connection, such as by using a network interface controller (NIC) to communicate data via a network (e.g., ETHERNET, 10baseT, 10base100, etc.). In the example of FIG. 1, the controller 112 communicates with the wire feeder 104 via the weld circuit via a communications transceiver 118, as described below.

The controller 112 includes at least one controller or processor 120 that controls the operations of the welding power supply 102. The controller 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

The example controller 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding current data, detect short circuit parameters, determine amount of spatter) during operation.

In some examples, the welding power flows from the power converter 110 through a weld cable 126 to the wire feeder 104 and the welding torch 106. The example weld cable 126 is attachable and detachable from weld studs at each of the welding power supply 102 and the wire feeder 104 (e.g., to enable ease of replacement of the weld cable 126 in case of wear or damage). Furthermore, in some examples, welding data is provided with the weld cable 126 such that welding power and weld data are provided and transmitted together over the weld cable 126. The communications transceiver 118 is communicatively coupled to the weld cable 126 to communicate (e.g., send/receive) data over the weld cable 126. The communications transceiver 118 may be implemented based on various types of power line communications methods and techniques. For example, the communications transceiver 118 may utilize IEEE standard P1901.2 to provide data communications over the weld cable 36. In this manner, the weld cable 126 may be utilized to provide welding power from the welding power supply 102 to the wire feeder 104 and the welding torch 106. Additionally or alternatively, the weld cable 126 may be used to transmit and/or receive data communications to/from the wire feeder 104 and the welding torch 106. The communications transceiver 118 is communicatively coupled to the weld cable 126, for example, via cable data couplers 127, to characterize the weld cable 126, as described in more detail below. The cable data coupler 127 may be, for example, a voltage or current sensor.

The example communications transceiver 118 includes a receiver circuit 121 and a transmitter circuit 122. Generally, the receiver circuit 121 receives data transmitted by the wire feeder 104 via the weld cable 126 and the transmitter circuit 122 transmits data to the wire feeder 104 via the weld cable 126. As described in more detail below, the communications transceiver 118 enables remote configuration of the power supply 102 from the location of the wire feeder 104 and/or compensation of weld voltages by the power supply 102 using weld voltage feedback information transmitted by the wire feeder 104. In some examples, the receiver circuit 121 receives communication(s) via the weld circuit while weld current is flowing through the weld circuit (e.g., during a welding-type operation) and/or after the weld current has stopped flowing through the weld circuit (e.g., after a welding-type operation). Examples of such communications include weld voltage feedback information measured at a device that is remote from the power supply 102 (e.g., the wire feeder 104) while the weld current is flowing through the weld circuit.

Example implementations of the communications transceiver 118 are described in U.S. Pat. No. 9,012,807. The entirety of U.S. Pat. No. 9,012,807 is incorporated herein by reference. However, other implementations of the communications transceiver 118 may be used.

The example wire feeder 104 also includes a communications transceiver 119, which may be similar or identical in construction and/or function as the communications transceiver 118.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 22 to enable, inhibit, or control gas flow (e.g., shielding gas) through the valve 130. Shielding gas exits the valve 130 and flows through a cable 132 (which in some implementations may be packaged with the welding power output) to the wire feeder 104 which provides the shielding gas to the welding application. In some examples, the welding system 100 does not include the gas supply 128, the valve 130, and/or the cable 132.

In some examples, the wire feeder 104 uses the welding power to power the various components in the wire feeder 104, such as to power a wire feeder controller 134. As noted above, the weld cable 126 may be configured to provide or supply the welding power. The welding power supply 102 may also communicate with a communications transceiver 119 of the wire feeder 104 using the weld cable 126 and the communications transceiver 118 disposed within the welding power supply 102. In some examples, the communications transceiver 119 is substantially similar to the communications transceiver 118 of the welding power supply 102. The wire feeder controller 134 controls the operations of the wire feeder 104. In some examples, the wire feeder 104 uses the wire feeder controller 134 to detect whether the wire feeder 104 is in communication with the welding power supply 102 and to detect a current welding process of the welding power supply 102 if the wire feeder 104 is in communication with the welding power supply 102.

A contactor 135 (e.g., high amperage relay) is controlled by the wire feeder controller 134 and configured to enable or inhibit welding power to continue to flow to the weld cable 126 for the welding application. In some examples, the contactor 135 is an electromechanical device. However, the contactor 135 may be any other suitable device, such as a solid state device. The wire feeder 104 includes a wire drive 136 that receives control signals from the wire feeder controller 134 to drive rollers 138 that rotate to pull wire off a spool 140 of wire. The wire is provided to the welding application through a torch cable 142. Likewise, the wire feeder 104 may provide the shielding gas from the cable 132 through the cable 142. The electrode wire, the shield gas, and the power from the weld cable 126 are bundled together in a single torch cable 144 and/or individually provided to the welding torch 106.

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power converter 110) to provide a return path for the weld current (e.g., as part of the weld circuit). The example work cable 148 attachable and/or detachable from the power supply 102 for ease of replacement of the work cable 148. The work cable 148 may be terminated with a clamp 150 (or another power connecting device), which couples the welding power supply 102 to the workpiece 146.

The example wire feeder 104 of FIG. 1 includes a voltage monitor 152 coupled to the weld circuit (e.g., electrically connected to the weld cable 126) and to the workpiece 146 via a clamp 154 and a sense lead 156. The example voltage monitor 152 may be coupled to the weld circuit via a cable data coupler 127. The voltage monitor 152 measures a weld voltage, such as the voltage between the output to the torch 106 (e.g., at a weld output connector or stud to which the cable 144 is connected to electrically connect the torch 106 to the wire feeder 104) and the workpiece 146 (e.g., via the sense lead 156). Because the wire feeder 104 is significantly closer to the arc than the power supply 102 is to the arc, the voltage measured at the wire feeder 104 is not affected by the impedance of the weld cable 126. As a result, the measurements captured by the voltage monitor 152 can be considered to be representative of the arc voltage.

The voltage monitor 152 captures one or more measurements (e.g., samples) of the weld voltage (e.g., the arc voltage, the voltage between the torch 106 and the workpiece 146). In some examples, the voltage monitor 152 assigns time stamps to the measurements for use in performing calculations, compensation, and/or matching of measurements to other measurements.

The example voltage monitor 152 and/or the controller 134 perform filtering (e.g., analog and/or digital filtering) to determine a representative value of the voltage over a designated time period. The representative value may be a filtered voltage value based on the measurements captured by the voltage monitor 152, such as an average voltage over the designated time period or a root-mean-square voltage over the designated time period. For example, the voltage monitor 152 and/or the controller 112 may calculate an average weld voltage for an N second time period based on a corresponding number of measurements captured by the voltage monitor 152 at a designated rate. In some examples, the time period for filtering is selected based on the switching frequency of the power converter 110 and/or a processing frequency used by the controller 134 and/or the processor(s) 120.

The example controller 134 stores the average weld voltage(s) and/or the voltage measurement(s) as weld voltage feedback information. The communications transceiver 119 transmits the weld voltage feedback information to the power supply 102 via the weld circuit (e.g., via the weld cable 126). The communications transceiver 119 may transmit the weld voltage feedback information while the weld circuit is conducting welding current (e.g., during a welding operation and/or while an arc is present between the torch 106 and the workpiece 146) and/or after the welding current is finished (e.g., at the conclusion of the welding operation during which the voltage monitor 152 captured the voltage measurements).

In some examples, the weld voltage feedback information includes a characteristic of the weld cable 126 such as a model number or other identifier of the weld cable 126 that can be used to accurately compensate the weld voltage for the drop over the weld cable 126. For example, if a model of weld cable has a determinable impedance without measurements, the controller 112 can use the identification of that weld cable to compensate the output from the power converter 110.

When the welding power supply 102 receives the voltage measurements, the power supply 102 updates a voltage feedback loop for controlling the power converter 110. The voltage feedback loop may be executed by the example controller 112 of FIG. 1. An example voltage feedback loop is a control algorithm that controls an output voltage using an input value and which is responsive to the output voltage and/or an intermediate signal associated with the output voltage. The controller 112 controls the welding-type power output by the power converter 110 according to a voltage feedback loop using the weld voltage feedback information to regulate the voltage at the remote device (e.g., at the wire feeder 104) to the weld voltage setpoint. For example, the controller 112 may use data received from the wire feeder 104 via the weld circuit to control the weld voltage at the arc to substantially equal the voltage setpoint (e.g., to compensate for the voltage drop caused by the weld cable 126).

The example power supply 102 includes a voltage monitor 160 that measures an actual power source output voltage. The actual power source output voltage is an approximation that is substantially equal to, but may be slightly different (e.g., a negligible difference) than, the real voltage that is output from the power source to the weld cable 126. The controller 112 may execute a feedback loop using the actual power source output voltage as an input. In some examples, the voltage monitor 160 is included in the power converter 110.

In some examples, the controller 112 receives an average arc voltage of the welding-type power measured at the wire feeder 104, and the voltage monitor 160 determines an average output voltage of the welding-type power measured at an output terminal of the power supply 102. The controller 112 adjusts a weld voltage of the welding-type power based on a difference between the average arc voltage and the average power supply output voltage.

In some examples, the voltage feedback loop is a constant voltage (CV) or voltage-controlled control loop. The example controller 112 calculates a current adjustment using a set of measurable and/or derivable voltage values.

As mentioned above, the weld cable 126 between the power supply 102 and the wire feeder 104 causes a voltage drop. The voltage drop caused by the weld cable 126 ($V_{cabledrop}$) can be expressed as a difference between a voltage measured at the power supply output (e.g., $V_{stud}$, measured across the power supply output studs or ports) and a voltage measured at the wire feeder 104 (e.g. $V_{feeder}$), as expressed in Equation 1 below. The $V_{feeder}$ term is received as the weld voltage feedback information, such as a weld voltage measurement and/or average weld voltage determined by the wire feeder 104 and communicated via the weld cable 126.

$$V_{cableDrop} = V_{stud} - V_{feeder} \qquad \text{Equation 1}$$

Adjusting the voltage output by the power converter 110 (e.g., $V_{stud}$) by the voltage drop in the weld cable 126 (e.g., $V_{cableDrop}$) effectively raises the voltage at the wire feeder 104 (e.g., $V_{feeder}$). Thus, the example controller 112 may adjust the power (e.g., voltage and/or current) output by the power converter 110 to cause the voltage at the wire feeder 104 (e.g., effectively the weld voltage or arc voltage) to substantially match a voltage setpoint.

The example controller 112 adjusts the voltage setpoint (e.g., $V_{cmd}$) to determine an adjusted voltage setpoint $V_{adjustedcmd}$ (e.g., an adjusted voltage command) according to Equation 2 below.

$$V_{AdjustedCmd} = V_{cmd} + V_{cableDrop} \qquad \text{Equation 2}$$

When the power supply 102 receives an average voltage measurement from the wire feeder 104 and generates average voltage measurements via the voltage monitor 160, the controller 112 controls the voltage of the welding-type power by determining an adjusted weld voltage setpoint (e.g., $V_{AdjustedCmd}$) based on the weld voltage setpoint (e.g., $V_{cmd}$) and the difference between the average arc voltage and the average power supply output voltage (e.g., an average $V_{cabledrop}$).

An error term $V_{error}$ may be calculated by the relationship shown in Equation 3 below.

$$V_{error} = (V_{AdjustedCmd} - V_{stud}) \qquad \text{Equation 3}$$

Figure 2:
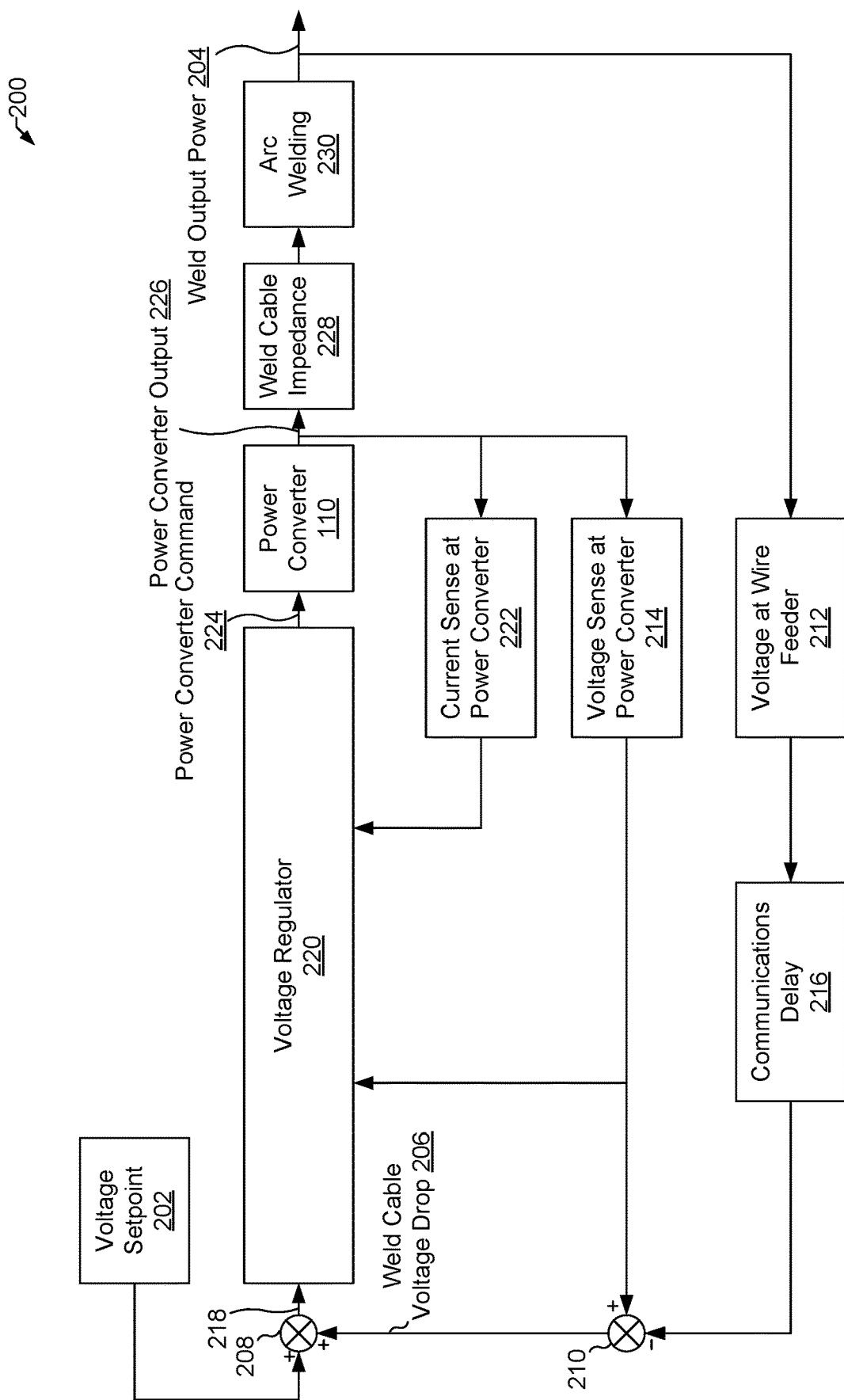
FIG. 2 is a block diagram of an example voltage feedback control loop that may be implemented by the controller of FIG. 1 to control a power converter in accordance with aspects of this disclosure.

By implementing Equation 3, the controller 112 may adjust the welding-type power based on a difference between the adjusted voltage setpoint and the average power supply output voltage. In the example of FIGS. 1 and 2, $V_{error}$ is used directly in calculating a new current command. If the adjusted voltage error is not used, calculating the output of the power converter 110, that output will not converge to an expected solution.

The example equations may be implemented by the controller 112 to control the voltage of the welding-type power output by the power converter 110 according to the voltage feedback loop by adjusting a voltage compensation value (e.g., $V_{error}$) applied to the welding-type power based on the weld voltage setpoint (e.g., $V_{cmd}$) and a measured voltage included in the weld voltage feedback information (e.g., $V_{feeder}$). In some examples, the controller 112 stores the voltage compensation value for generating the welding-type power for subsequent welding-type operations. The controller 112 may then adjust the voltage of the welding-type power output by the power converter 110 based on the voltage compensation value during the subsequent weld.

The controller 112 may control the voltage of the welding-type power output by the power converter 110 based on multiple communications received via the weld circuit, where the multiple communications correspond to multiple voltage measurements (e.g., $V_{feeder}$ values) by the wire feeder 104. For example, the controller 112 may store multiple power supply voltage measurements (e.g., $V_{stud}$ values) and/or weld current measurements that correspond to the plurality of voltage measurements (e.g., $V_{feeder}$ values) and determine the voltage compensation value based on the weld voltage measurements, the power supply output voltage measurements and/or the weld current measurements. The voltage compensation value may be determined by calculating an impedance of the weld cable 126 and/or by performing a lookup of weld voltage measurements, power supply output voltage measurements and/or weld current measurements in a table stored in the storage device 125 and/or in the memory 124.

In some examples, the control equation implemented by the controller 112 is executed with a first execution rate (e.g., 20 kHz, or one command update every 50 µs, while the weld voltage feedback information (e.g., $V_{feeder}$) is up dated at a second rate that may be limited by the weld cable bandwidth (e.g., 2 Hz, or one weld voltage update every 500,000 µs). The different update rates result in a multi-rate control system, in which reported voltage data from the wire feeder 104 that could be sampled or delivered at any point during a welding operation is used in a higher-speed control loop.

The example controller 112 avoids an unstable control loop situation caused by the data update rate mismatch and non-uniform network data arrival (e.g., variable sampling interval) by: 1) using low-pass filtered data for the voltage setpoint $V_{cmd}$ and the weld voltage feedback information $V_{feeder}$ to calculate the weld cable voltage drop $V_{cableDrop}$ and the adjusted voltage setpoint $V_{AdjustedCmd}$; 2) calculating the adjusted voltage setpoint $V_{AdjustedCmd}$ when a valid weld voltage feedback information $V_{feeder}$ arrives via the weld cable 126 and use the most recently calculated value for the adjusted voltage setpoint $V_{AdjustedCmd}$ (e.g., until the next weld voltage feedback information arrives and a new value for the adjusted voltage setpoint is calculated); and 3) on start-up of the welding power supply, setting the adjusted voltage setpoint $V_{AdjustedCmd}$ to a maximum allowed value of the adjusted voltage setpoint $V_{AdjustedCmd}$ and allowing the system to adjust to the actual measured voltage drops.

In some examples, the controller 112 controls the voltage of the welding-type power output by the power converter 110 according to the voltage feedback loop by adjusting the welding-type power while the weld current is being output through the weld circuit (e.g., instead of making adjustments between welds). Additionally or alternatively, the controller 112 makes the adjustments between welding operations (e.g., adjusts a voltage for a subsequent welding operation to compensate for a voltage error observed during a prior welding operation).

In some examples, the display 116 displays the weld voltage feedback information, such as the measured weld voltage, for real-time viewing of the actual weld voltage by an operator or other viewer of the power supply 102. Additionally, the user interface 114 may permit selection of the weld voltage and/or the power supply output voltage for display on the display device 116. By displaying (or permitting display) of the real-time weld voltage during the weld, the operator, supervisor, and/or any other interested viewer can be assured that the weld voltage specified by the user is the weld voltage at the arc. Such assurance may be useful for verifying compliance with a weld procedure specification.

FIG. 2 is a block diagram of an example voltage feedback control loop 200 that may be implemented by the controller 112 of FIG. 1 to control the power converter 110. For example, the controller 112 may implement the control loop 200 by executing the instruction 125. The control loop 200 receives a voltage setpoint 202 as an input and generates a weld output power 204 that has substantially the same voltage as the voltage setpoint 202.

In the control loop 200, the voltage setpoint 202 is added to a weld cable voltage drop 206 using a summer 208. The weld cable voltage drop 206 is determined at a summer 210 as a difference between a wire feeder voltage 212 and a voltage 214 sensed at the power converter 110. The wire feeder voltage 212 is substantially identical to the voltage of the weld output power 204, and may incur a communications delay 216 that controls the use of the wire feeder voltage 212 and/or the weld cable voltage drop 206 in the control loop 200 (e.g., the summer 208 may receive the weld cable voltage drop 206 at a rate that is different than the execution rate of the control loop 200).

The summer 208 outputs a voltage error 218 to a voltage regulator 220. The voltage regulator 220 receives the voltage error 218, the voltage 214 sensed at the power converter 110, and a current 222 sensed at the power converter 110. The voltage regulator 220 outputs a power converter command 224 based on the voltage error 218, the voltage 214 sensed at the power converter 110, and the current 222 sensed at the power converter 110. The power converter command 224 controls the power converter 110 to generate an output power 226. The power converter 110 outputs the output power 226 to the weld cable 126, which has a corresponding weld cable impedance 228 in the control loop 200, and to a welding arc 230. The voltage 214 sensed at the power converter 110 and the current 222 sensed at the power converter 110 are measured substantially at the output of the power converter 110 to the weld cable 126.

Figure 3:
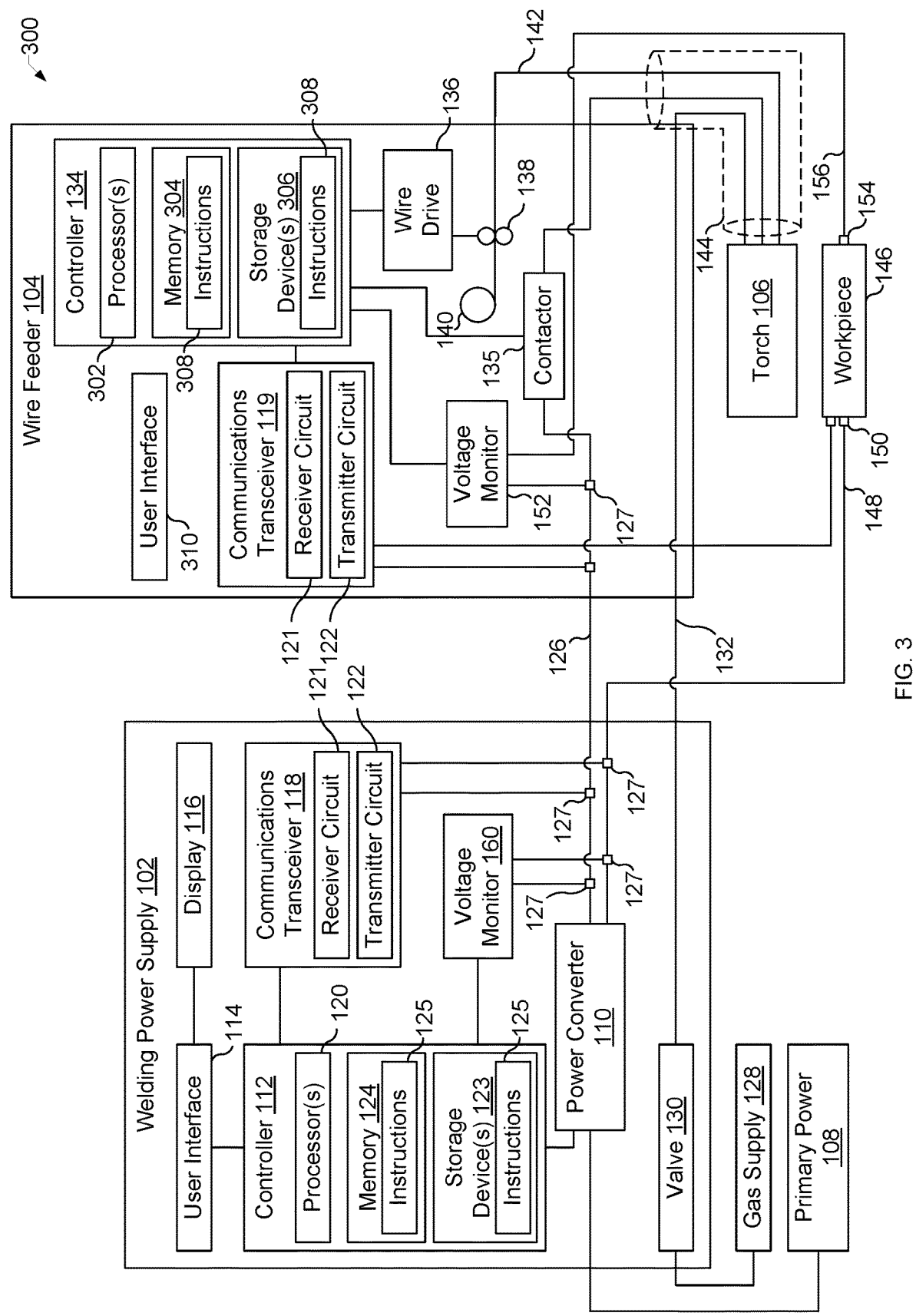
FIG. 3 shows another example welding-type system in accordance with aspects of this disclosure.

FIG. 3 shows another example welding-type system 300. The welding-type system 300 includes the power supply 102 and the wire feeder 104 of FIG. 1. In contrast with the example system 100 of FIG. 1, in the welding-type system 300 the controller 134 implements portions of a control loop, such as the control loop 200 of FIG. 2 and/or the control scheme described above with respect to Equations 1-3, to control a weld voltage at the output of the wire feeder 104 to be substantially equal to a voltage setpoint. The example controller 134 includes a processor 302, a memory device 304, a storage device 306, and/or computer readable instructions 308.

In the example system 300 of FIG. 3, the wire feeder 104 receives the voltage setpoint from the welding power supply 102 (e.g., via the communications transceivers 118, 119 and the weld cable 126) and/or via a user interface 310 of the wire feeder 104. The controller 134 determines a difference between a measured weld voltage (e.g., from the voltage monitor 152 and the voltage setpoint.

As in the system 100 of FIG. 1, the controller 134 feeds back information to the power supply 102 to enable the power supply 102 to adjust the voltage output by the power converter 110. For example, by determining a difference between the voltage measured at the wire feeder 104 and the voltage setpoint, the wire feeder 104 can feed back a difference or error value for use by the power supply 102.

In some examples, the wire feeder 104 executes the control loop to determine a voltage command, and communicates the voltage command to the power supply 102 (e.g., using the communications transceiver 119) to be implemented by the power supply 102 to achieve the setpoint voltage at the weld voltage. The power supply 102 implements the commanded voltage by outputting the commanded voltage to the weld cable 126. In such examples, the wire feeder 104 has knowledge of the current voltage command at the power supply. As such, the example wire feeder 104 may measure a current flowing through the weld cable 126 and use the current, the voltage command, and the voltage measured at the wire feeder 104 to characterize the impedance of the weld cable 126.

Figure 4:
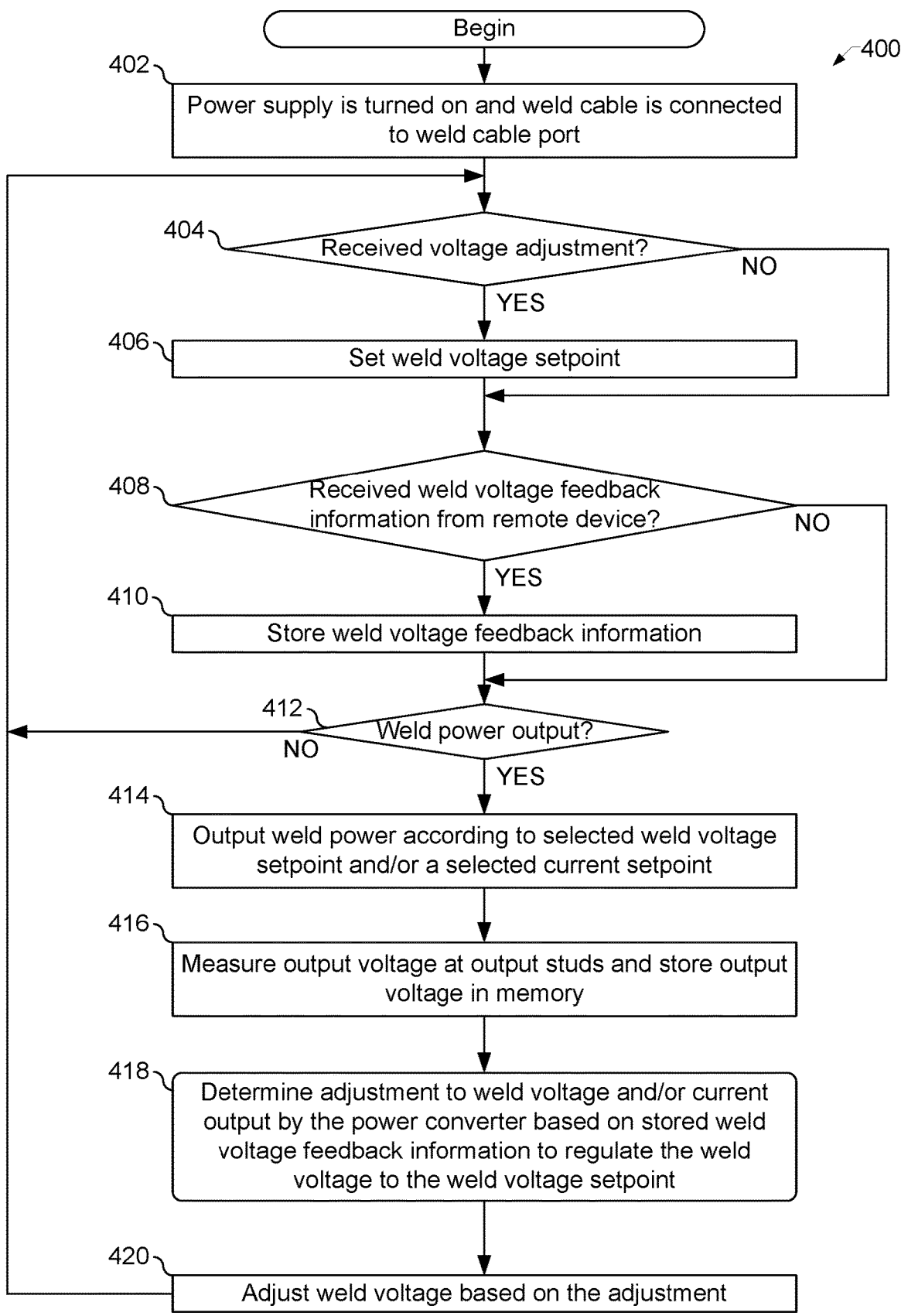
FIG. 4 is a flowchart illustrating example machine readable instructions which may be executed by the example welding-type power supply of FIG. 1 to compensate welding output voltage in accordance with aspects of this disclosure.

FIG. 4 is a flowchart illustrating example machine readable instructions 400 which may be executed by the example welding-type power supply 102 of FIG. 1 to compensate welding output voltage. The example instructions 400 may be stored in the storage device(s) 123 and/or the memory 124, and/or executed by the controller 112 of FIG. 1.

At block 402, the power supply 102 is turned on and the weld cable 126 is connected to a weld cable port. At block 404, the controller 112 determines whether a voltage adjustment has been received. For example, controller 112 may identify a change to a voltage setpoint received via the user interface 114. If a voltage adjustment has been received (block 404), at block 406 the controller 112 sets the weld voltage setpoint.

After setting the weld voltage setpoint (block 406), or if a voltage adjustment has not been received (block 404), at block 408, the controller 112 determines whether a weld voltage feedback information has been received from a remote device (e.g., the remote wire feeder 104 of FIG. 1). For example, the controller 112 may receive the weld voltage feedback information from the communications transceiver 118 and/or the receiver circuit 121, which extracts the weld voltage feedback information from the weld circuit including the weld cable 126. If the weld voltage feedback information has been received from the remote device (block 408), at block 410 the controller 112 stores the weld voltage feedback information (e.g., in the storage device(s) 123, in the memory 124). The stored weld voltage feedback information may include, for example, a voltage measured at the wire feeder 104 that is representative of the weld voltage, a voltage error term identifying a difference between the remotely measured voltage and a voltage setpoint, a voltage output command, and/or any other voltage feedback information that may be used by the power supply 102 to control the output of the power converter 110 to set the weld voltage substantially equal to the voltage setpoint. The stored weld voltage feedback information may replace a previously stored weld voltage feedback information and/or may be appended as a most recent weld voltage feedback information.

After storing the weld voltage feedback information (block 410), at block 412, the controller determines whether weld power is being output by the power converter 110. For example, the controller 112 may measure the current output by the power converter 110 to determine whether the current is greater than a threshold. If the weld power is not being output (block 412), control returns to block 404.

When the weld power is being output (block 412), at block 414 the controller 112 controls the power converter 110 to output the weld power according to the selected weld voltage setpoint and/or a selected current setpoint. For example, the controller 112 may execute the control loop 200 of FIG. 2 and/or the control loop described above with reference to Equations 1-3.

At block 416, the controller 112 measures and output voltage at output studs of the power supply 102 and stores the output voltage in the memory device 124. For example, the controller 112 may receive the measurement of the output voltage from the voltage monitor 160. At block 418, the controller 112 determines an adjustment to the weld voltage and/or the weld current output by the power converter 110 based on the stored weld feedback voltage information, to regulate the weld voltage to the weld voltage setpoint. For example, the controller 112 may execute a feedback loop to compensate for the voltage drop across the weld cable 126 between the power supply 102 and the remote wire feeder 104. The controller 112 may receive additional weld voltage feedback information via the weld circuit while a welding operation is occurring and repeatedly adjust the output voltage from the power converter 110 to control the weld voltage to the weld voltage setpoint. Example instructions to implement block 418 are described below with reference to FIGS. 5A-5B.

At block 420, the controller 112 adjusts the weld voltage output by the power converter 110 based on the adjustment (determined in block 418). Control then returns to block 404.

As mentioned above, in the example instructions 400 of FIG. 4, the controller 112 may receive weld voltage feedback information via the weld circuit while weld power is being output and/or after weld power has been stopped.

Figure 5A:
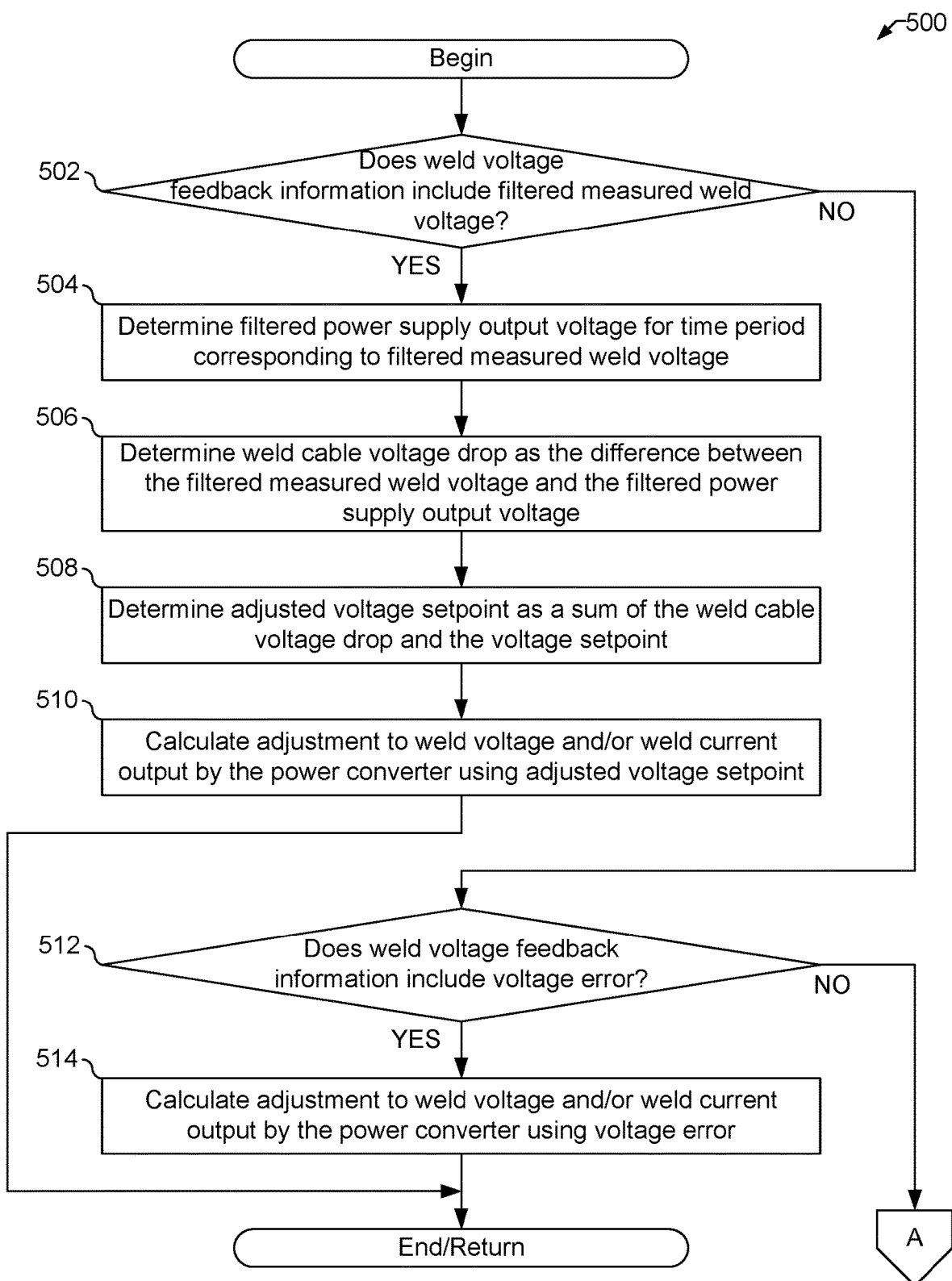
FIGS. 5A and 5B illustrate a flowchart illustrating example machine readable instructions which may be executed by the example controller of FIG. 1 to determine an adjustment to a weld voltage output by the power supply and/or the power converter to regulate a weld voltage to a weld voltage setpoint in accordance with aspects of this disclosure.
Figure 5B:
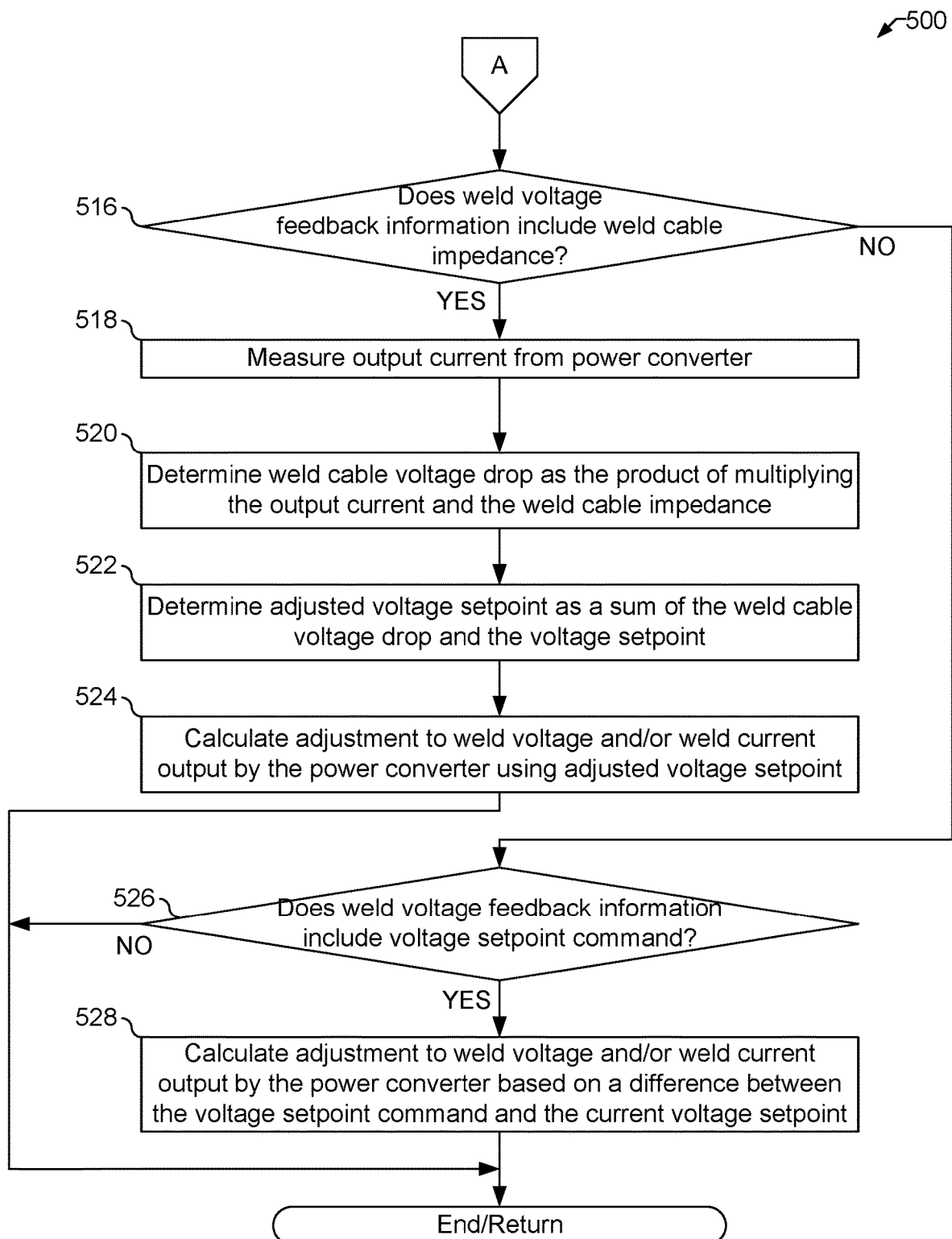

FIGS. 5A and 5B illustrate a flowchart illustrating example machine readable instructions which may be executed by the example controller 112 of FIG. 1 to determine an adjustment to a weld voltage output by the power supply 102 and/or the power converter 110 to regulate a weld voltage to a weld voltage setpoint. The example instructions 500 of FIGS. 5A-5B may be executed by the controller 112 of FIG. 1 to implement block 418 of FIG. 4.

The instructions 500 enter from block 416 of FIG. 4. At block 502, the controller 112 determines whether the weld voltage feedback information (e.g., received via the weld circuit, the communications transceiver 118, and/or the receiver circuit 121) includes a filtered measured weld voltage. For example, the weld voltage feedback information may include a voltage value representative of an average (or median, or root-mean-square, or any other representative value) voltage measured at a remote device such as the wire feeder 104 of FIG. 1. An example is described below with reference to an average voltage value.

When the weld voltage feedback information includes a filtered weld voltage measurement (block 502), at block 504 the controller 112 determines a filtered power supply output voltage for a time period corresponding to the filtered measured weld voltage. For example, the controller 112 may store measurements of the voltage output by the power converter 110 in the storage device(s) 123 and/or the memory 124, and calculate the average of the voltage measurements during the time period represented by the weld voltage feedback information. In some examples, the weld voltage feedback information includes a timestamp or other indicator of the time period for which the filtered voltage measurements apply.

At block 506, the controller 112 determines a weld cable voltage drop as the difference between the filtered measured weld voltage and the filtered power supply output voltage. Block 506 may implement Equation 1 above. At block 508, the controller 112 determines an adjusted voltage setpoint as a sum of the weld cable voltage drop and the voltage setpoint. Block 508 may implement Equation 2 above. At block 510, the controller 112 calculates an adjustment to the weld voltage and/or the weld current output by the power converter 110 using the adjusted voltage setpoint. Block 510 may implement Equation 3 above. After block 510, the example instructions 500 end and/or return control to a calling function, such as block 418 of FIG. 4 to use the adjustment to control the power converter 110 using the instructions 400 of FIG. 4.

When the weld voltage feedback information does not include a filtered weld voltage measurement (block 502), at block 512 the controller 112 determines whether the weld voltage feedback information includes a voltage error. For example, the wire feeder 104 or other remote device may calculate a voltage error term and transmit the voltage error term to the power supply 102 via the weld circuit (e.g., while weld power is being output by the power converter 110 to the weld circuit). When the weld voltage feedback information includes a voltage error (block 512), at block 514, the controller 112 calculates an adjustment to the weld voltage and/or the weld current output by the power converter 110 using the voltage error.

After block 514, the example instructions 500 end and/or return control to a calling function, such as block 418 of FIG. 4 to use the adjustment to control the power converter 110 using the instructions 400 of FIG. 4.

Turning to FIG. 5B, when the weld voltage feedback information does not include a voltage error (block 512), at block 516 the controller 112 determines whether the weld voltage feedback information includes a weld cable impedance (block 516). For example, the wire feeder 104 may calculate a weld cable impedance based on knowledge of the voltage being output by the power supply 102, the weld current, and the voltage measured at the wire feeder 104. If the weld voltage feedback information includes a weld cable impedance (block 516), at block 518 the controller measures (or otherwise determines) an output current from the power converter 110.

In some examples, the controller 112 may calculate the weld cable impedance using the weld voltage feedback information (e.g., voltage measurements at the wire feeder 104, a voltage error term, etc.) and measurements of the voltage and current output by the power converter 110 to the weld cable 126.

At block 520, the controller 112 determines a voltage drop over the weld cable 126 as the product of multiplying the output current and the weld cable impedance. At block 522, the controller 112 determines an adjusted voltage setpoint as a sum of the weld cable voltage drop and the voltage setpoint. Block 522 may implement Equation 2 above. At block 524, the controller 112 calculates an adjustment to the weld voltage and/or the weld current output by the power converter 110 using the adjusted voltage setpoint. Block 524 may implement Equation 3 above. After block 524, the example instructions 500 end and/or return control to a calling function, such as block 418 of FIG. 4 to use the adjustment to control the power converter 110 using the instructions 400 of FIG. 4.

If the weld voltage feedback information does not include a weld cable impedance (block 516), at block 526 the controller 112 determines whether the weld voltage feedback information includes a voltage setpoint command. For example, the voltage setpoint command may be determined and provided to the power supply 102 by the remote device (e.g., the wire feeder 104) via the weld circuit to enable the wire feeder 104 to calculate a voltage setpoint and use the voltage setpoint to control the power supply 102. If the weld voltage feedback information includes a voltage setpoint command (block 526), at block 528, the controller 112 calculates an adjustment to the weld voltage and/or weld current output by the power converter 110 based on a difference between the voltage setpoint command (from the wire feeder 104) and the current voltage setpoint (used by the controller 112 to control the power converter 110). After block 528 and/or if the weld voltage feedback information does not include a voltage setpoint command (block 526), the example instructions 500 end and/or return control to a calling function, such as block 418 of FIG. 4 to use the adjustment to control the power converter 110 using the instructions 400 of FIG. 4.

Figure 6:
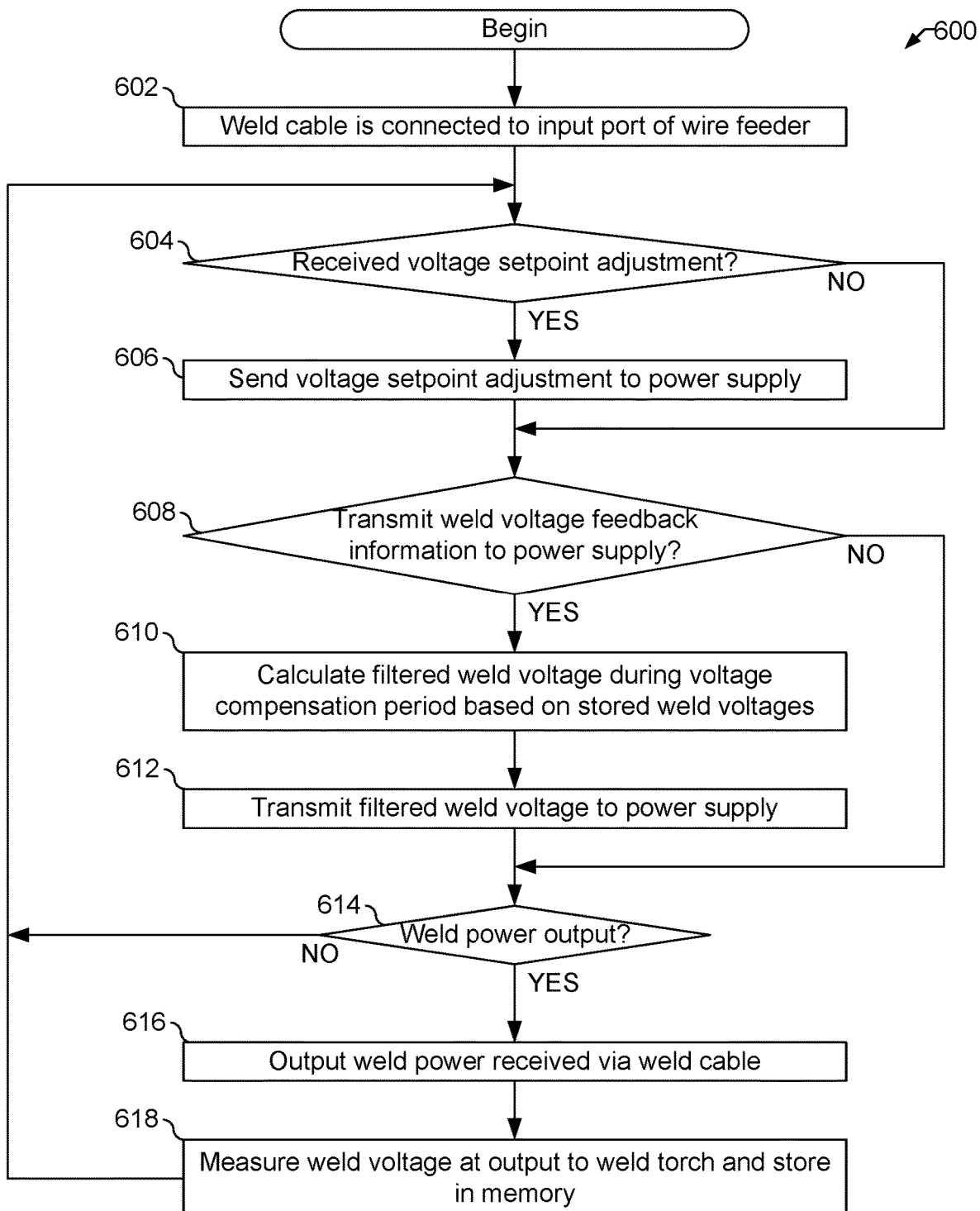
FIG. 6 is a flowchart illustrating example machine readable instructions which may be executed by the example wire feeder of FIG. 1 to compensate welding output voltage in accordance with aspects of this disclosure.

FIG. 6 is a flowchart illustrating example machine readable instructions 600 which may be executed by the example wire feeder 104 of FIG. 1 to compensate welding output voltage. For example, the controller 134 may execute the instructions 600 to provide weld voltage feedback information to the power supply 102 via the weld circuit and/or the communications transceiver 119. While the example instructions 600 are described below with reference to the wire feeder 104, the instructions 600 may be used and/or modified to implement other remote welding devices.

At block 602, the weld cable 126 is connected to an input port (e.g., input stud) of the wire feeder 104. At block 604, the controller 134 determines whether a voltage setpoint adjustment has been received. For example, controller 134 may identify a change to a voltage setpoint received via a user interface of the wire feeder 104. If a voltage adjustment has been received (block 604), at block 606 the controller 134 sends the voltage setpoint adjustment to the power supply 102 via the weld circuit and/or the transceiver 119.

After sending the voltage setpoint adjustment (block 606), or if a voltage setpoint adjustment has not been received (block 604), at block 608, the controller 134 determines whether to transmit weld voltage feedback information to the power supply 102. For example, the controller 134 may track a number of voltage measurement samples taken by the voltage monitor 152 and, when the number of samples satisfies a threshold, generate and transmit the weld voltage feedback information. Additionally or alternatively, the controller 134 may generate and transmit the weld voltage feedback information in response to an event, such as a conclusion of a welding operation (e.g., detected as the weld current falling below a threshold current). In some examples, the controller 134 may generate and transmit the weld voltage feedback information based on a feedback frequency, which may be based on a communication bandwidth (e.g., the communication bandwidth of the weld circuit and the transceiver 119). In the example below, the weld voltage feedback information includes a filtered measured weld voltage over a number of samples and/or a time period. However, other weld voltage feedback information may be transmitted, such as a different representative weld voltage value, a voltage error value between a measured weld voltage and the weld voltage setpoint, a weld cable characteristic such as a calculated weld cable impedance or a weld cable identifier, and/or a voltage setpoint command.

If a condition is met to transmit weld voltage feedback information to the power supply 102 (block 608), at block 610 the voltage monitor 152 and/or the controller 134 calculates a filtered weld voltage during a voltage compensation period based on a set of stored arc voltages (e.g., in the memory 124 of the wire feeder 104). At block 612, the communications transceiver 119 transmits the filtered weld voltage to the power supply 102 (e.g., via the weld circuit including the weld cable 126). The communications transceiver 119 may also transmit a timestamp or other indicator of the time period represented by the filtered weld voltage. The timestamp may be used by the power supply to match the received weld voltage feedback information to voltage measurements taken by the voltage monitor 160 for comparison. In some examples, the example controller 134 clears stored weld voltages to free storage space for subsequent sampling. In some other examples, subsequent samples overwrite older samples in the memory 124.

After transmitting the filtered weld voltage (block 612), or if transmitting weld voltage feedback information to the power supply 102 is not performed (block 608), at block 614, the controller 134 determines whether weld power is to be output to a weld operation. For example, the controller 134 may determine whether a trigger of the weld torch 106 is depressed. If weld power is being output (block 614), at block 616, the wire feeder 104 outputs the weld power received via the weld cable 126 to the weld torch 106 for a welding-type operation (e.g., welding, wire preheating, workpiece preheating, etc.). The voltage monitor 152 measures the weld voltage at an output to the weld torch 106 and stores the measured voltage in the memory 124. Control then returns to block 604.

Figure 7:
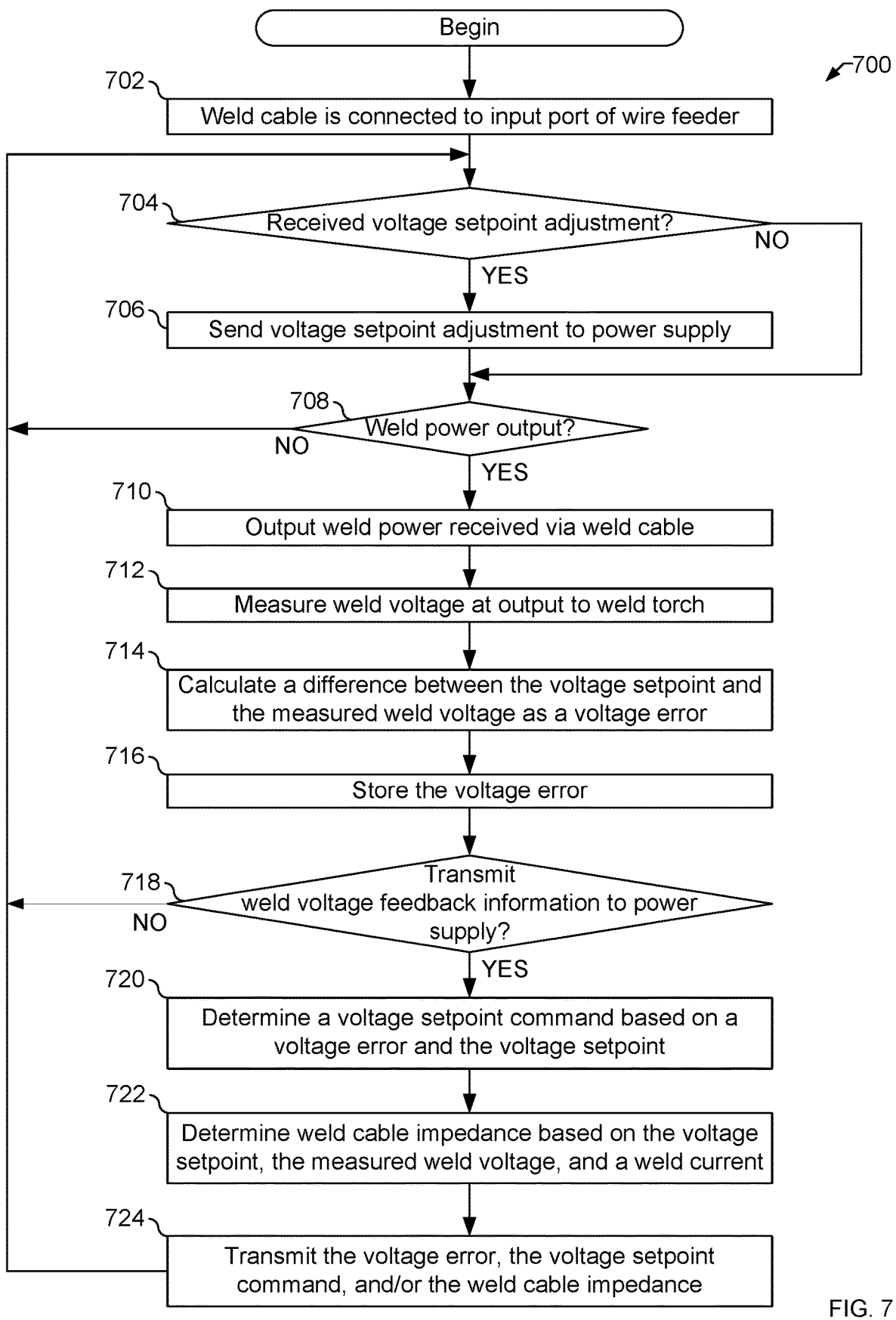
FIG. 7 is a flowchart illustrating example machine readable instructions which may be executed by the example wire feeder of FIG. 3 to compensate welding output voltage in accordance with aspects of this disclosure.

FIG. 7 is a flowchart illustrating example machine readable instructions 700 which may be executed by the example wire feeder of FIG. 3 to compensate welding output voltage. For example, the controller 134 of FIG. 3 may execute the instructions 700 to execute at least a portion of a welding control loop, and to provide feedback and/or commands to the power supply 102 via the weld circuit and/or the communications transceiver 119. While the example instructions 700 are described below with reference to the wire feeder 104, the instructions 700 may be used and/or modified to implement other remote welding devices.

At block 702, the weld cable 126 is connected to an input port (e.g., input stud) of the wire feeder 104. At block 704, the controller 134 determines whether a voltage setpoint adjustment has been received. For example, controller 134 may identify a change to a voltage setpoint received via a user interface 310 of the wire feeder 104. If a voltage adjustment has been received (block 704), at block 706 the controller 134 sends the voltage setpoint adjustment to the power supply 102 via the weld circuit and/or the transceiver 119.

After sending the voltage setpoint adjustment (block 706), or if a voltage setpoint adjustment has not been received (block 704), at block 708 the controller 134 determines whether weld power is to be output to a weld operation. For example, the controller 134 may determine whether a trigger of the weld torch 106 is depressed. If weld power is to be output (block 708), at block 710 the wire feeder 104 outputs the weld power received via the weld cable 126. At block 712, the voltage monitor 152 measures the weld voltage at the output to the weld torch 106. At block 714, the controller 134 calculates a difference between the voltage setpoint and the measured weld voltage as a voltage error. At block 716, the controller 134 stores the voltage error (e.g., in the memory 124).

After storing the voltage error (block 716), and/or if the weld power is not being output (block 708), at block 718 the controller 134 determines whether to transmit weld voltage feedback information. If the controller 134 is to transmit the weld voltage feedback information (block 718), at block 720 the controller 134 determines a voltage setpoint command based on a voltage error and the voltage setpoint. For example, the controller 134 may add the voltage error to the voltage setpoint to determine the adjusted command voltage to be used by the power supply 102 as an output voltage to the weld cable 126.

At block 722, the controller 134 determines an impedance of the weld cable 126 based on the voltage setpoint, the measured weld voltage, and a weld current. The weld current may be an actual weld current measured at the wire feeder 104 and/or at the power supply 102. The example controller 134 may determine weld cable impedance using Equation 4 below, or any other method. In Equation 4 below, $Z_{cable}$ is the weld cable impedance, $V_{measured}$ is the measured weld voltage at the wire feeder 104, $V_{setpoint}$ is the voltage setpoint, and $I_{measured}$ is the weld current.

$$Z_{cable} = (V_{setpoint} - V_{measured})/I_{measured} \qquad \text{Equation 4}$$

At block 724, the controller 134 transmits (e.g., via the communications transceiver 119 and/or the weld circuit) the voltage error, the voltage setpoint command, and/or the weld cable impedance to the power supply 102 as weld voltage feedback information. For example, the controller 134 may provide any or all of the voltage error, the voltage setpoint command, and/or the weld cable impedance to the power supply 102 to enable the power supply 102 to make adjustments to control the weld voltage to the voltage setpoint.

After transmitting the voltage error, the voltage setpoint command, and/or the weld cable impedance (block 724), or if transmission is not to occur (block 718), control returns to block 704.

FIG. 8 illustrates another example welding system 800. The example welding system 800 includes a power supply 802 and a wire feeder 804. The example power supply 802 is similar to the power supplies 102 of FIGS. 1 and 3 and the wire feeder 804 is similar to the wire feeders 104 of FIGS. 1 and 3. However, the example power supply 802 and the example wire feeder 804 are not, by themselves, capable of communicating via a weld circuit. The example power supply 802 and the example wire feeder 804 are provided with respective weld communication adapters 806, 808 to enable the system 800 to compensate a weld voltage for a voltage drop caused by the weld cable 126 during a welding operation.

Each of the communications adapters 806, 808 includes processor(s) 120a, 120b, storage device(s) 123a, 123b, memory 124a, 124b, and/or instructions 125a, 125b, which may be similar, identical, or different than the processor(s) 120, storage device(s) 123, memory 124, and/or instructions 125 of FIGS. 1 and 3. Each of the communications adapters 806, 808 further includes a weld circuit transceiver 810a, 810b, which may include a receiver circuit 121a, 121b and/or a transmitter circuit 122a, 122b. In some examples, one of the communications adapters 806, 808 includes a receiver circuit 121a, 121b to receive data via a weld circuit and the other of the communications adapters 806, 808 includes a transmitter circuit 122a, 122b to transmit the data. The receiver circuits 121a, 121b and/or the transmitter circuits 122a, 122b may be similar, identical, or different than the receiver circuit 121 and/or the transmitter circuit 122 of FIGS. 1 and 3. The weld cable communications adapters 806, 808 of FIG. 8 may be supplemented by other forms of communications such as wireless (e.g., WiFi) communications methods.

Each of the communications adapters 806, 808 further includes a voltage monitor 812a, 812b and/or a local communications adapter 814a, 814b. The example voltage monitors 812a, 812b may be connected to the weld circuit to measure voltages at different locations in the weld circuit. For example, the voltage monitor 812a may be connected to output terminals of the welding power supply 802 (e.g., on a first end of the weld cable) and the voltage monitor 812b may be connected to input terminals and/or output terminals of the wire feeder 804 (e.g., on an opposite end of the weld cable). The connections may be implemented using terminal adapters connected between the ends of the weld cable 126 and the power supply 802 and the wire feeder 804, The example local communications adapters 814a, 814b are configured to communicate with the welding power supply 802 and the wire feeder 804 using a serial or parallel communications port. Using the weld communications adapters 806, 808, welding devices such as the welding power supply 802 and/or the wire feeder 804 that are not configured for weld circuit communications may still take advantage of the benefits of weld circuit communications including a reduced number of cables extending from the welding power supply 802 to a remote device such as a suitcase wire feeder that may be hundreds of feet away.

The welding power supply 802 (e.g., the controller 112) and the local adapter 814a communicates data and/or commands to provide weld voltage feedback information to the welding power supply 802 for compensating a weld voltage, and/or to provide weld parameters and/or data to the wire feeder 804 via the weld cable 126. Similarly, the local communications adapter 814b communicates with the wire feeder 804 (e.g., the controller 134) to provide voltage information and/or commands from the wire feeder 804 to the power supply 802.

In an example of operation of the system 800, the receiver circuit 121a of the communications adapter 806 receive a communication via the weld circuit (e.g., the weld cable 126) while current is flowing through the weld circuit. The communication includes weld voltage feedback information measured while the current is flowing through the weld circuit at a device (e.g., the wire feeder 804, the weld communications adapter 808) that is remote from the power supply 802 and remote from the weld circuit communications device 806. For instance, the weld voltage feedback information may be measured by the voltage monitor 812b and/or by the voltage monitor 158. The processor(s) 120a generates power supply control information based on the weld voltage feedback information. Depending on the form of the weld voltage feedback information, the processor(s) 120a may do conversion of the weld voltage feedback information to a voltage error, a voltage setpoint, a weld cable impedance, and/or any other control information. For example, the voltage monitor 812a may measure a power supply output voltage at the output of the welding power supply 802 when the weld voltage feedback information including a remote voltage measured closer to the weld than the power supply output voltage measurement location.

The local communications adapter 814a transmits the power supply control information to the controller 112 of the welding power supply 802 (e.g., via a direct serial or parallel connection) to enable the power supply 802 to control welding-type power output by the power converter 110. Thus, the controller 112 may use information transmitted via the weld circuit during a welding operation to regulate a weld voltage of the welding operation to a weld voltage setpoint.

To provide the weld voltage feedback information to the power supply 802 via the weld circuit, in some examples the voltage monitor 812b measures a voltage of welding-type power transmitted via the weld circuit during a welding-type power operation (e.g., near the end of the weld cable 126 terminating at the wire feeder 804). The transmitter circuit 122b transmits, via the weld circuit during transmission of the welding-type power over the weld circuit, the weld voltage feedback information based on the voltage of the welding-type power. In some other examples, the local communications adapter 814b receives weld voltage feedback information from the controller 134 on a first interface such as a serial or parallel port, a wireless connection, and/or another local connection interface. The weld cable communication transmitter 122b transmits the weld voltage feedback information (e.g., to the weld communications adapter 806) via the weld circuit during transmission of the welding-type power over the weld circuit.

While FIG. 8 illustrates an example in which both the power supply 802 and the wire feeder 804 are incapable of communicating over a weld circuit (and particularly, while current is flowing in the weld circuit), in some examples only one of the weld communications adapters 806, 808 is used to provide weld circuit communication capabilities to the welding power supply 802 or the wire feeder 804 when the other of the power supply 802 or the wire feeder 804 has weld circuit communications integrated.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
   a power converter configured to convert input power to welding-type power based on a weld voltage setpoint and to output the welding-type power via a weld circuit;
   a receiver circuit configured to receive a communication via the weld circuit while current is flowing through the weld circuit or after the current has stopped flowing through the weld circuit, the communication including weld voltage feedback information measured at a device remote from the power supply while the current is flowing through the weld circuit, wherein the weld voltage feedback information comprises a filtered arc voltage of the welding-type power measured at a wire feeder;
   a power source voltage monitor configured to measure an actual power source output voltage and to determine a filtered power supply output voltage of the welding-type power measured at an output terminal of the welding-type power supply; and
   a controller configured to control the welding-type power output by the power converter according to a voltage feedback loop using the weld voltage feedback information, the weld voltage setpoint, and the actual power source output voltage to regulate a weld voltage at the remote device to the weld voltage setpoint, wherein the controller is configured to adjust the weld voltage of the welding-type power based on a difference between the filtered arc voltage and the filtered power supply output voltage.

2. The welding-type power supply as defined in claim 1, wherein the controller is configured to control a voltage of the welding-type power output by the power converter according to the voltage feedback loop by adjusting the welding-type power while the current is being output through the weld circuit.

3. The welding-type power supply as defined in claim 1, wherein the controller is configured to:
   control the voltage of the welding-type power output by the power converter according to the voltage feedback loop by adjusting a voltage compensation value applied to the welding-type power based on the weld voltage setpoint and a measured voltage included in the weld voltage feedback information;
   store the voltage compensation value for generating the welding-type power for a subsequent weld.

4. The welding-type power supply as defined in claim 3, wherein the controller is configured to adjust the voltage of the welding-type power output by the power converter based on the voltage compensation value during the subsequent weld.

5. The welding-type power supply as defined in claim 3, wherein the controller is configured to control the voltage of the welding-type power output by the power converter based on a plurality of communications received via the weld circuit, the plurality of communications corresponding to a plurality of voltage measurements.

6. The welding-type power supply as defined in claim 5, wherein the controller is configured to:
   store the plurality of voltage measurements taken at the remote device and at the power supply and corresponding to at least one of power supply output voltage measurements or welding current measurements; and
   determine the voltage compensation value based on the at least one of the power supply output voltage measurements or the welding current measurements.

7. The welding-type power supply as defined in claim 1, wherein the controller is configured to control the voltage of the welding-type power by determining an adjusted weld voltage setpoint based on the weld voltage setpoint and the difference between the filtered arc voltage and the filtered power supply output voltage.

8. The welding-type power supply as defined in claim 7, wherein the controller is configured to adjust the welding-type power based on a difference between the adjusted weld voltage setpoint and the filtered power supply output voltage.

9. The welding-type power supply as defined in claim 1, wherein the controller is configured to adjust the welding-type power at a first rate and the receiver circuit is to receive the weld voltage feedback information at a second rate, and the controller is configured to adjust the welding-type power at the first rate based on a most recently received weld voltage feedback information.

10. The welding-type power supply as defined in claim 1, wherein the weld voltage feedback information comprises a voltage error between the voltage setpoint and a voltage measured at the device remote from the power supply while the current is flowing through the weld circuit, the controller configured to control the welding-type power output using the voltage error.

11. The welding-type power supply as defined in claim 10, wherein the controller is configured to calculate an impedance of a weld cable in the weld circuit using the voltage error.

12. The welding-type power supply as defined in claim 1, wherein the weld voltage feedback information comprises a characteristic of a weld cable that is part of the weld circuit, the controller configured to control the welding-type power output using the characteristic.

13. The welding-type power supply as defined in claim 12, wherein the characteristic comprises a calculated impedance of the weld cable.

14. The welding-type power supply as defined in claim 1, wherein the weld voltage feedback information comprises a voltage setpoint command, the controller configured to control the welding type power output using the voltage setpoint command by controlling the power converter to output the welding-type power having a voltage determined by the voltage setpoint command.

15. A welding-type power supply, comprising:
   a power converter configured to convert input power to welding-type power based on a user-selected voltage and to output the welding-type power via a weld circuit;

a voltage monitor configured to measure a power supply output voltage of the welding-type power during a weld;

a receiver circuit configured to receive, via the weld circuit while current is flowing through the weld circuit or after the current has stopped flowing through the weld circuit, a communication including a measured and filtered arc voltage of the welding-type power measured at a first location in the weld circuit different than a second location at which the voltage monitor is to measure the power supply output voltage;

a power source voltage monitor configured to measure an actual power source output voltage and to determine a filtered power supply output voltage of the welding-type power measured at an output terminal of the welding-type power supply; and a controller configured to:

when the communication including the measured and filtered arc voltage is received during the weld, adjust the weld voltage of the welding-type power during the weld to reduce a difference between the user-selected voltage and the measured and filtered arc voltage based on the power supply output voltage by adjusting the weld voltage of the welding-type power based on a difference between the filtered arc voltage and the filtered power supply output voltage; or when the communication including the measured and filtered arc voltage is received after the weld, adjust a voltage compensation value applied to the welding-type power based on the user-selected voltage and based on a difference between the power supply output voltage and the measured and filtered arc voltage, and store the voltage compensation value for generating the welding-type power for a subsequent weld.

16. The welding-type power supply as defined in claim 15, wherein the controller is configured to:

store the voltage compensation value based on the measured arc voltage measured during a first weld; and adjust the welding-type power based on the voltage compensation value during the subsequent weld.

17. The welding-type power supply as defined in claim 16, wherein the controller is configured to determine the voltage compensation value based on a plurality of communications received via the weld circuit, the plurality of communications corresponding to a plurality of arc voltage measurements.

18. The welding-type power supply as defined in claim 17, wherein the controller is configured to:

store at least one of power supply output voltage measurements or welding current measurements corresponding to the plurality of arc voltage measurements; and determine the voltage compensation value based on the at least one of the power supply output voltage measurements or the welding current measurements and the plurality of arc voltage measurements.

* * * * *